US011988265B2

(12) United States Patent
Nakagawa et al.

(10) Patent No.: US 11,988,265 B2
(45) Date of Patent: May 21, 2024

(54) SHOCK ABSORBER

(71) Applicant: Hitachi Astemo, Ltd., Ibaraki (JP)

(72) Inventors: Reiji Nakagawa, Zama (JP); Mikio Yamashita, Zama (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 556 days.

(21) Appl. No.: 17/272,690

(22) PCT Filed: Oct. 31, 2019

(86) PCT No.: PCT/JP2019/042722
§ 371 (c)(1),
(2) Date: Mar. 2, 2021

(87) PCT Pub. No.: WO2020/095806
PCT Pub. Date: May 14, 2020

(65) Prior Publication Data
US 2021/0348668 A1 Nov. 11, 2021

(30) Foreign Application Priority Data

Nov. 5, 2018 (JP) ................. 2018-208120

(51) Int. Cl.
*F16F 9/32* (2006.01)
*F16F 9/19* (2006.01)
*F16F 9/36* (2006.01)

(52) U.S. Cl.
CPC ............... *F16F 9/362* (2013.01); *F16F 9/19* (2013.01)

(58) Field of Classification Search
CPC ............... F16J 15/164; F16J 15/322
(Continued)

(56) References Cited

U.S. PATENT DOCUMENTS 9,360,078 B2 * 6/2016 Yamashita ............... F16F 9/18
2001/0023638 A1 9/2001 Yamaguchi et al.
(Continued)

FOREIGN PATENT DOCUMENTS

JP 60-59839 U 4/1985
JP 2-91269 U 7/1990
(Continued)

OTHER PUBLICATIONS

International Search Report of PCT/JP2019/042722 dated Dec. 10, 2019.
(Continued)

Primary Examiner — Christopher P Schwartz
(74) Attorney, Agent, or Firm — MATTINGLY & MALUR, PC

(57) ABSTRACT

This shock absorber includes: a friction member including an annular elastic rubber portion and an annular base portion (to which the elastic rubber portion is fixed; and a communication path that decreases a pressure difference between both sides of the friction member. The base portion includes an annular disk portion. The elastic rubber portion includes a minimum inner diameter portion on an inner peripheral side and includes an inner peripheral connection portion connected to an inner peripheral portion of the annular disk portion. A protrusion suppression structure portion that suppresses protruding of an inner peripheral surface formed from the minimum inner diameter portion toward the inner peripheral connection portion is provided at least partially in a circumferential direction between the inner peripheral connection portion and the minimum inner diameter portion of the elastic rubber portion.

8 Claims, 11 Drawing Sheets

(58) Field of Classification Search
USPC .................. 188/322.16, 322.17; 277/551
See application file for complete search history.

(56) References Cited

U.S. PATENT DOCUMENTS

| 2007/0052180 | A1* | 3/2007 | Watanabe | F16J 15/322 |
| | | | | 277/551 |
| 2009/0066034 | A1* | 3/2009 | Jordan | F16J 15/164 |
| | | | | 277/518 |
| 2015/0204412 | A1 | 7/2015 | Yamashita et al. | |
| 2021/0324935 | A1* | 10/2021 | Yamashita | F16F 7/09 |

FOREIGN PATENT DOCUMENTS

| JP | 2003-130119 A | 5/2003 |
| JP | 2004-251416 A | 9/2004 |
| JP | 2007-92926 A | 4/2007 |
| JP | 4546860 B2 | 9/2010 |
| JP | 5810220 B2 | 11/2015 |
| KR | 10-2015-0037728 A | 4/2015 |

OTHER PUBLICATIONS

Written Opinion of PCT/JP2019/042722 dated Dec. 10, 2019.
Japanese Office Action received in corresponding Japanese Application No. 2020-556011 dated Dec. 7, 2021.
Korean Office Action received in corresponding Korean Application No. 10-2021-7005206 dated Jul. 27, 2022.

* cited by examiner

SHOCK ABSORBER

TECHNICAL FIELD

The present invention relates to a shock absorber.

Priority is claimed on Japanese Patent Application No. 2018-208120, filed Nov. 5, 2018, the content of which is incorporated herein by reference.

BACKGROUND ART

As a configuration of a shock absorber, a configuration having a friction member that generates frictional resistance against a moving piston rod is known in addition to a seal member that prevents a leakage of a working liquid (for example, see Patent Literatures 1 and 2).

CITATION LIST

Patent Literature

Patent Literature 1

Japanese Patent No. 4546860

Patent Literature 2

Japanese Patent No. 5810220

SUMMARY OF INVENTION

Technical Problem

In the shock absorber, it is desired to obtain preferable operating characteristics using the friction member.

The present invention provides a shock absorber capable of obtaining preferable operating characteristics.

Solution to Problem

According to an aspect of the present invention, a shock absorber includes: a friction member that includes an annular elastic rubber portion which slidably contacts to a piston rod and an annular base portion to which the elastic rubber portion is fixed; and a communication path that decreases a pressure difference between both sides of the friction member in an axial direction. The base portion includes an annular disk portion. The elastic rubber portion includes a minimum inner diameter portion on an inner peripheral side and includes an inner peripheral connection portion connected to an inner peripheral portion of the annular disk portion. A protrusion suppression structure portion that suppresses protruding of an inner peripheral surface formed from the minimum inner diameter portion toward the inner peripheral connection portion is provided at least partially in a circumferential direction between the inner peripheral connection portion and the minimum inner diameter portion of the elastic rubber portion.

Advantageous Effects of Invention

According to the shock absorber, preferable operating characteristics can be obtained.

DESCRIPTION OF EMBODIMENTS

First Embodiment

Hereinafter, a shock absorber according to a first embodiment of the present invention will be described with reference to FIGS. 1 to 7.

Figure 1:
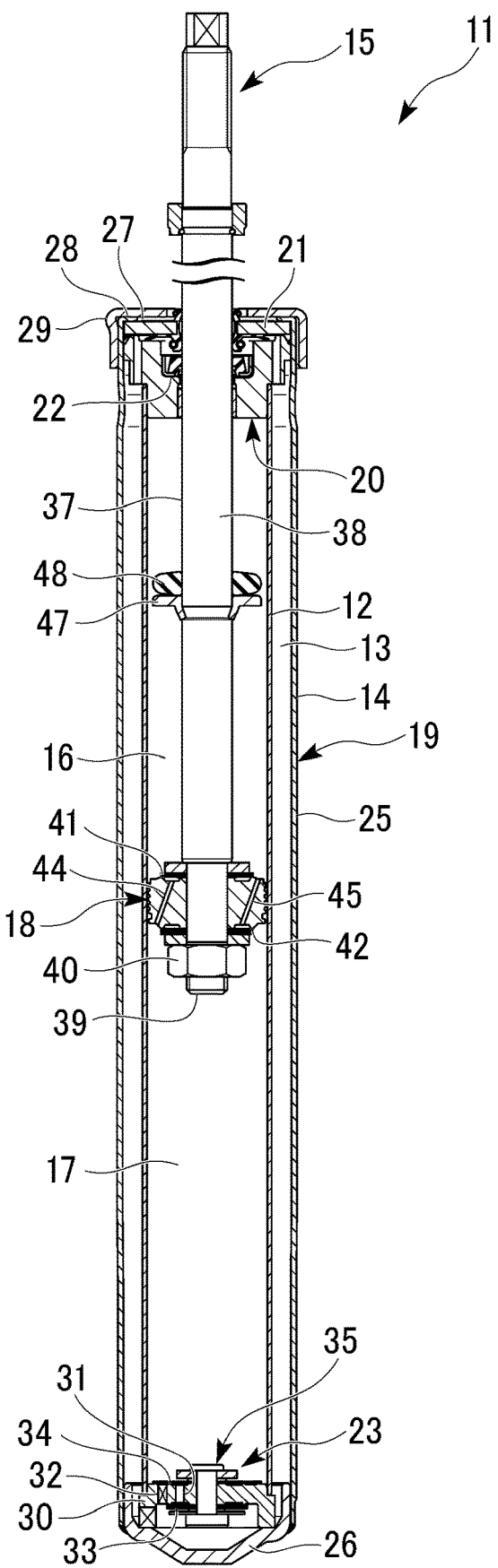
FIG. 1 is a cross-sectional view showing a shock absorber according to a first embodiment of the present invention.

A shock absorber 11 according to the first embodiment shown in FIG. 1 is a liquid pressure shock absorber in which a working liquid is used as a working fluid. More specifically, this shock absorber is a hydraulic shock absorber in which an oil liquid is used as a working liquid. The shock absorber 11 is mainly used in an automobile suspension device.

The shock absorber 11 includes an inner cylinder 12, an outer cylinder 14 which has a diameter larger than that of the inner cylinder 12 and is coaxially disposed to form a reservoir chamber 13 between the inner cylinder 12 and the outer cylinder, a piston rod 15 which is disposed on the center axis of the inner cylinder 12 and of which one side in the axial direction is inserted into the inner cylinder 12 and the other side in the axial direction extends outward from the inner cylinder 12 and the outer cylinder 14, and a piston 18 which is connected to one end portion of the piston rod 15, is slidably fitted into the inner cylinder 12, and divides the inside of the inner cylinder 12 into two chambers 16 and 17. That is, the shock absorber 11 is of a double cylinder type in which the cylinder 19 includes the inner cylinder 12 and the outer cylinder 14. The piston 18 is slidably fitted into the inner cylinder 12 of the cylinder 19 and divides the inside of the inner cylinder 12 of the cylinder 19 into two chambers 16 and 17. The piston rod 15 is connected to the piston 18 and extends to the outside of the cylinder 19.

Additionally, the present invention can be used not only for a double cylinder type but also for a single cylinder type liquid pressure shock absorber. Further, the present invention can be also used in a liquid pressure shock absorber or the like using a damping force adjusting mechanism.

The piston rod 15 moves together with the piston 18 connected to one end portion thereof. The other end portion of the piston rod 15 protrudes outward from the cylinder 19, that is, the inner cylinder 12 and the outer cylinder 14. In the cylinder 19, an oil liquid which is a working liquid is enclosed in the inner cylinder 12. An oil liquid corresponding to a working liquid and a high-pressure gas are enclosed in the reservoir chamber 13 between the inner cylinder 12 and the outer cylinder 14. In addition, atmospheric air may be enclosed in the reservoir chamber 13 instead of the high-pressure gas.

The shock absorber 11 includes a rod guide 20 which is disposed at an end position on the protruding side of the piston rod 15 in the cylinder 19, a seal member 21 that is located at the end position on the protruding side of the piston rod 15 in the cylinder 19 and is disposed on the outer side (the upside in the up and down direction of FIGS. 1 and 2) of the rod guide 20 in the inward and outward direction (the up and down direction of FIGS. 1 and 2 and hereinafter, the cylinder inward and outward direction) of the axial direction of the cylinder 19, a friction member 22 that is provided on the inner side of the seal member 21 in the cylinder inward and outward direction (the downside of the up and down direction of FIGS. 1 and 2) and is provided between the seal member 21 and the rod guide 20, and a base valve 23 which is disposed at the end portion on the side opposite to the rod guide 20, the seal member 21, and the friction member 22 in the axial direction of the cylinder 19.

All of the rod guide 20, the seal member 21, and the friction member 22 are formed in an annular shape. The piston rod 15 is slidably inserted on the inner side of the rod guide 20, the seal member 21, and the friction member 22. The rod guide 20 supports the piston rod 15 to be movable in the axial direction while restricting the movement in the radial direction and guides the movement of the piston rod 15. The inner peripheral portion of the seal member 21 slides on the outer peripheral portion of the piston rod 15 moving in the axial direction to prevent the oil liquid in the inner cylinder 12 and the high-pressure gas and the oil liquid of the reservoir chamber 13 in the outer cylinder 14 from leaking from the cylinder 19 to the outside. In other words, the seal member 21 prevents the oil liquid and the gas in the cylinder 19 from leaking from the shock absorber 11 to the outside. The friction member 22 is fitted and fixed to the rod guide 20 at the outer peripheral portion thereof and slides on the outer peripheral portion of the piston rod 15 at the inner peripheral portion thereof to generate a frictional resistance in the piston rod 15. The friction member is not used for a sealing purpose.

The outer cylinder 14 of the cylinder 19 has a substantially bottomed cylindrical shape including a cylindrical body member 25 and a bottom member 26 closing one end side opposite to the protruding side of the piston rod 15 in the body member 25. The body member 25 includes a locking portion 28 which protrudes inward in the radial direction from the position of the opening portion 27 on the protruding side of the piston rod 15. A cover 29 is attached to the side of the opening portion 27 of the outer cylinder 14 to cover the locking portion 28 and the seal member 21.

Additionally, in this embodiment, a configuration in which the cover 29 is attached has been described, but the cover 29 may not be provided.

The inner cylinder 12 of the cylinder 19 is formed in a cylindrical shape. In the inner cylinder 12, one end side in the axial direction is supported while being fitted to the base body 30 of the base valve 23 disposed on the inner side of the bottom member 26 of the outer cylinder 14 and the other end side in the axial direction is supported while being fitted to the rod guide 20 fitted to the inside of the opening portion 27 of the outer cylinder 14.

The base body 30 of the base valve 23 is provided with oil passages 31 and 32 capable of allowing the chamber 17 in the inner cylinder 12 to communicate with the reservoir chamber 13 between the outer cylinder 14 and the inner cylinder 12. In the base body 30, the disk valve 33 is disposed on the side of the bottom member 26 in the axial direction and the disk valve 34 is disposed on the side opposite to the bottom member 26 in the axial direction. The disk valve 33 is a contraction side damping valve capable of opening and closing the inner oil passage 31. The disk valve 34 is a check valve capable of opening and closing the outer oil passage 32. These disk valves 33 and 34 are attached to the base body 30 by a rivet 35 inserted through the base body 30. Additionally, in this embodiment, the disk valves 33 and 34 are attached to the base body 30 by the rivet 35 inserted through the base body 30, but may be attached thereto by a nut.

The disk valve 33 generates a damping force by allowing the oil liquid to flow from the chamber 17 to the side of the reservoir chamber 13 through a passage hole (not shown) and the oil passage 31 of the disk valve 34 and restricts the flow of the oil liquid in the opposite direction. In contrast, the disk valve 34 allows the oil liquid to flow from the reservoir chamber 13 to the side of the chamber 17 through the oil passage 32 without any resistance and restricts the flow of the oil liquid in the opposite direction. That is, the disk valve 33 is a damping valve which generates a damping force by opening the oil passage 31 when the piston rod 15 moves to the contraction side to increase the amount of insertion into the cylinder 19 and the piston 18 moves to the side of the chamber 17 to increase the pressure of the chamber 17. The disk valve 34 is a suction valve which allows the oil liquid to flow from the reservoir chamber 13 into the chamber 17 without substantially generating a damping force by opening the oil passage 32 when the piston rod 15 moves to the extension side to increase the amount of protrusion from the cylinder 19 and the piston 18 moves to the side of the chamber 16 to decrease the pressure of the chamber 17.

Additionally, the disk valve 34 which is the check valve may actively generate a damping force on the extension side. Further, these disk valves 33 and 34 may be omitted and used as orifices.

The piston rod 15 includes a main shaft portion 38 which includes an outer peripheral surface 37 formed by a cylindrical surface having a constant diameter and an inner end shaft portion 39 which is formed at the end portion to be inserted into the inner cylinder 12 to have a diameter smaller than that of the main shaft portion 38.

A nut 40 is threaded to the inner end shaft portion 39. The piston 18 and the disk valves 41 and 42 on both sides thereof are attached to the inner end shaft portion 39 by the nut 40.

The chamber 16 is formed between the piston 18 and the rod guide 20. The chamber 16 is a rod side chamber through which the piston rod 15 penetrates. The chamber 17 is formed between the piston 18 and the base valve 23. The chamber 17 is a bottom side chamber which is on the side of the bottom member 26 in the cylinder 19.

The piston rod 15 does not penetrate the inside of the chamber 17.

A stopper member 47 and a buffer 48 which are formed in an annular shape are provided in a portion between the rod guide 20 and the piston 18 of the main shaft portion 38 in the piston rod 15. The piston rod 15 is inserted through the inner peripheral side of the stopper member 47. The stopper member 47 is swaged and fixed to the main shaft portion 38. The piston rod 15 is inserted through the buffer 48. The buffer 48 is disposed between the stopper member 47 and the rod guide 20.

The piston 18 is provided with oil passages 44 and 45 capable of allowing the chamber 17 on the side of the bottom member 26 in the inner cylinder 12 to communicate with the chamber 16 on the side opposite to the bottom member 26. In the piston 18, the disk valve 41 is disposed on the side opposite to the bottom member 26 and the disk valve 42 is disposed on the side of the bottom member 26. The disk valve 41 is a contraction side damping valve capable of opening and closing the oil passage 44. The disk valve 42 is an extension side damping valve capable of opening and closing the oil passage 45.

The disk valve 41 allows the oil liquid to flow from the chamber 17 to the chamber 16 through the oil passage 44 and restricts the flow of the oil liquid in the opposite direction. The disk valve 42 allows the oil liquid to flow from the chamber 16 to the chamber 17 through the oil passage 45 and restricts the flow of the oil liquid in the opposite direction. A fixed orifice (not shown) which allows the chamber 17 to communicate with the chamber 16 through the oil passage 44 even in a closed state of the disk valve 41 is provided between the disk valve 41 and the piston 18. A fixed orifice (not shown) which allows the chamber 17 to communicate with the chamber 16 through the oil passage 45 even in a closed state of the disk valve 42 is provided between the disk valve 42 and the piston 18.

When the piston rod 15 moves to the contraction side and the piston 18 moves to the side of the chamber 17 to increase the pressure of the chamber 17, in a region in which a moving speed of the piston 18 (hereinafter, referred to as a piston speed) is slow, the oil liquid flows from the chamber 17 to the chamber 16 through a fixed orifice (not shown) having a constant flow path area so that a damping force of orifice characteristics is generated. In a region in which the piston speed is fast, the disk valve 41 is separated from the piston 18 to open the oil passage 44 and the oil liquid flows from the chamber 17 to the chamber 16 with a flow path area corresponding to the separation amount from the piston 18 so that a damping force of valve characteristics is generated.

When the piston rod 15 moves to the extension side and the piston 18 moves to the side of the chamber 16 to increase the pressure of the chamber 16, in a region in which the piston speed is slow, the oil liquid flows from the chamber 16 to the chamber 17 through a fixed orifice (not shown) having a constant flow path area so that a damping force of orifice characteristics is generated. In a region in which the piston speed is fast, the disk valve 42 is separated from the piston 18 to open the oil passage 45 and the oil liquid flows from the chamber 16 to the chamber 17 with a flow path area corresponding to the separation amount from the piston 18 so that a damping force of valve characteristics is generated.

When the piston rod 15 moves to the extension side and the amount of protrusion from the cylinder 19 increases, that amount of the oil liquid flows from the reservoir chamber 13 to the chamber 17 through the oil passage 32 while opening the disk valve 34 of the base valve 23. In contrast, when the piston rod 15 moves to the contraction side and the insertion amount into the cylinder 19 increases, that amount of the oil liquid flows from the chamber 17 to the reservoir chamber 13 through the oil passage 31 while opening the disk valve 33.

Figure 2:
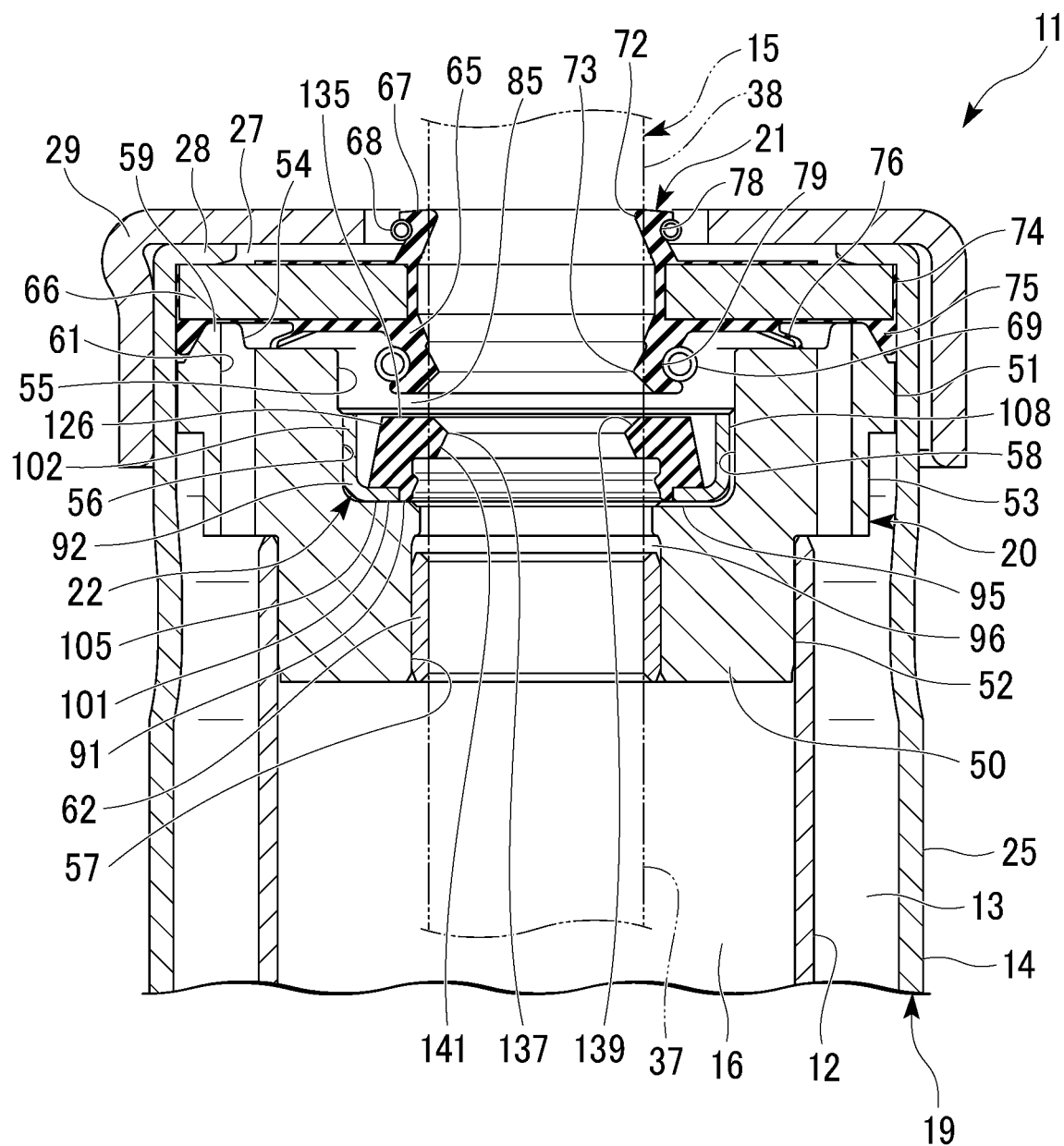
FIG. 2 is a cross-sectional view showing a main part of the shock absorber according to the first embodiment of the present invention.

As shown in FIG. 2, the rod guide 20 includes a metallic rod guide main body 50 which is formed in a substantially stepped cylindrical shape. The rod guide main body 50 has an outer shape in which a large diameter outer diameter portion 51 is formed on one side in the axial direction, a small diameter outer diameter portion 52 having a diameter smaller than that of the large diameter outer diameter portion 51 is formed on the other side in the axial direction, and a medium diameter outer diameter portion 53 having a medium diameter is formed therebetween. The rod guide main body 50 is fitted to the inner peripheral portion of the body member 25 of the outer cylinder 14 at the large diameter outer diameter portion 51 and is fitted to the inner peripheral portion of the inner cylinder 12 at the small diameter outer diameter portion 52.

A maximum diameter hole portion 54 is formed in an end portion on the side of the large diameter outer diameter portion 51 in the axial direction at the center of the rod guide main body 50 in the radial direction. A large diameter hole portion 55 which has a diameter smaller than that of the maximum diameter hole portion 54 is formed on the side of the small diameter outer diameter portion 52 in the axial direction in relation to the maximum diameter hole portion 54. A medium diameter hole portion 56 which has a diameter slightly smaller than that of the large diameter hole portion 55 is formed on the side opposite to the maximum diameter hole portion 54 in the axial direction of the large diameter hole portion 55. A small diameter hole portion 57 which has a diameter smaller than that of the medium diameter hole portion 56 is formed on the side opposite to the large diameter hole portion 55 in the axial direction of the medium diameter hole portion 56.

The medium diameter hole portion 56 is provided with a communication groove 58 which is continuous to the inner peripheral surface and the bottom surface thereof. The communication groove 58 is formed on the inner peripheral surface of the medium diameter hole portion 56 over the entire length in the axial direction and is formed on the bottom surface of the medium diameter hole portion 56 over the entire length in the radial direction. That is, the communication groove 58 is formed so that the inner peripheral surface of the large diameter hole portion 55 is connected to the inner peripheral surface of the small diameter hole portion 57.

An annular convex portion 59 is formed in the end portion on the side of the large diameter outer diameter portion 51 in the axial direction of the rod guide main body 50 to protrude outward in the axial direction. The maximum diameter hole portion 54 is formed inside the annular convex portion 59. The rod guide main body 50 is provided with a communication hole 61 which is formed on the inner diameter side of the annular convex portion 59 to penetrate therethrough in the axial direction. One end side of the communication hole 61 opens into the maximum diameter hole portion 54 and the other end side thereof opens to the end surface on the side of the small diameter outer diameter portion 52 of the medium diameter outer diameter portion 53. The communication hole 61 communicates with the reservoir chamber 13 between the outer cylinder 14 and the inner cylinder 12.

The rod guide 20 includes the rod guide main body 50 and a cylindrical collar 62 which is fitted and fixed to the inner peripheral portion of the rod guide main body 50. The collar 62 is formed by coating an inner periphery of a metal cylinder formed of an SPCC material or an SPCE material with fluororesin-impregnated bronze. The collar 62 is fitted into the small diameter hole portion 57 of the rod guide main body 50. The piston rod 15 is inserted through the collar 62 to slidably contact to the outer peripheral surface 37 of the main shaft portion 38. The collar 62 is fitted and fixed to the end portion opposite to the medium diameter hole portion 56 in the small diameter hole portion 57. In other words, a portion in which the collar 62 is not existing is present in the small diameter hole portion 57 on the side of the medium diameter hole portion 56.

The seal member 21 is disposed at one end portion of the cylinder 19 in the axial direction and comes into press-contact with the outer peripheral surface 37 of the main shaft portion 38 of the piston rod 15 at the inner peripheral portion. The seal member 21 restricts the outward leakage of the oil liquid or the like from a gap between the rod guide 20 and the main shaft portion 38 of the piston rod 15. Additionally, in FIG. 2, the side of the rod guide 20 of the shock absorber 11 is shown in a state in which the piston rod 15 is excluded. Thus, the seal member 21 shown in FIG. 2 is in a natural state before the piston rod 15 is inserted. Then, the outer peripheral surface 37 of the main shaft portion 38 of the piston rod 15 when inserted is indicated by a virtual line (two-dotted chain line).

The seal member 21 includes an integrally molded oil seal main body 67 that includes a seal portion 65 which is formed of an elastic rubber material with has high slidability such as nitrile rubber and fluororubber and a metallic annular member 66 embedded in the seal portion 65 to maintain the shape of the seal member 21 and obtain a fixing strength, an annular spring 68 which is fitted to the outer peripheral portion on the outer side of the seal portion 65 of the oil seal main body 67 in the cylinder inward and outward direction, and an annular spring 69 which is fitted to the outer peripheral portion on the inner side of the seal portion 65 in the cylinder inward and outward direction.

An inner portion of the seal portion 65 in the radial direction includes an annular cylindrical dust lip 72 which extends from the outside in the cylinder inward and outward direction on the inner peripheral side of the annular member 66 in a direction separating from the annular member 66 in the axial direction, and an annular cylindrical oil lip 73 which extends from the inside in the cylinder inward and outward direction on the inner peripheral side of the annular member 66 in a direction separating from the annular member 66 in the axial direction. Further, an outer portion of the seal portion 65 in the radial direction includes an outer peripheral seal 74 which covers the outer peripheral surface of the annular member 66 at the outer end position, and an annular seal lip 75 which extends inward in the cylinder inward and outward direction from the outer peripheral seal 74. Further, the seal portion 65 includes a tapered check lip 76 which is formed on the inner side of the intermediate radial portion in the cylinder inward and outward direction to protrude inward in the cylinder inward and outward direction and to increase in diameter toward the protruding front end side.

The dust lip 72 has a tapered cylindrical shape in which an inner diameter decreases as it goes outward in the cylinder inward and outward direction from the annular member 66. An annular groove 78 to which the spring 68 is fitted is formed in the outer peripheral portion of the dust lip 72 to be recessed inward in the radial direction. Additionally, in this embodiment, an example in which the spring 68 is used is shown, but the spring may not be provided.

The oil lip 73 has a tapered cylindrical shape in which a diameter decreases as it goes inward in the cylinder inward and outward direction from the annular member 66. An annular groove 79 to which the spring 69 is fitted is formed in the outer peripheral portion of the oil lip 73 to be recessed inward in the radial direction.

The seal member 21 seals and contacts the inner peripheral portion of the body member 25 of the outer cylinder 14 in the outer peripheral seal 74 in a state in which the dust lip 72 is disposed on the atmosphere side, that is, the outside in the cylinder inward and outward direction and the oil lip 73 is disposed on the inner side in the cylinder inward and outward direction. In this state, the seal member 21 is locked by that the position of the annular member 66 is sandwiched by the annular convex portion 59 of the rod guide 20 and the swaged locking portion 28 of the outer cylinder 14. At this time, the seal member 21 is in a sealing and contacting state while the seal lip 75 is disposed between the annular convex portion 59 of the rod guide 20 and the outer cylinder 14. Further, the oil lip 73 is disposed in the large diameter hole portion 55 of the rod guide 20 with a gap therebetween in the radial direction.

The main shaft portion 38 of the piston rod 15 is inserted through the dust lip 72 and the oil lip 73 in the seal member 21 attached to the cylinder 19. In this state, one end of the piston rod 15 protrudes from one end of the cylinder 19. The dust lip 72 is provided at one end side of the cylinder 19 where the piston rod 15 protrudes. The oil lip 73 is provided on the inner side of the dust lip 72 in the cylinder inward and outward direction.

The spring 68 fitted to the annular groove 78 of the dust lip 72 maintains a tightening force to be constant in a direction in which the dust lip 72 is in close contact with the piston rod 15. Further, the spring 68 is also used to adjust a tightening force for satisfying the design specifications. The spring 69 fitted to the annular groove 79 of the oil lip 73 adjusts a tightening force in a direction in which the oil lip 73 is in close contact with the piston rod 15.

The check lip 76 of the seal portion 65 can seal and contact a flat bottom surface along the axially orthogonal direction of the maximum diameter hole portion 54 of the rod guide 20 over the entire circumference with a predetermined tightening allowance. The oil liquid leaking from the chamber 16 through a gap between the rod guide 20 and the piston rod 15 is accumulated in a chamber 85 mainly formed by the large diameter hole portion 55 on the gap side in relation to the check lip 76 of the seal member 21. The check lip 76 is positioned between the chamber 85 and the communication hole 61 of the rod guide 20. The check lip 76 is opened when the pressure of the chamber 85 becomes larger than the pressure of the reservoir chamber 13 by a predetermined amount and allows the oil liquid accumulated in the chamber 85 to flow to the reservoir chamber 13 through the communication hole 61.

That is, the check lip 76 serves as a check valve which allows only the flow of the oil liquid in a direction from the chamber 85 to the reservoir chamber 13 and restricts the flow of the oil liquid and the gas in the opposite direction.

In the seal member 21, the dust lip 72 maintains the airtightness while being in close contact with the piston rod 15 by the tightening allowance and the tension force of the spring 68. The dust lip 72 mainly restricts the entry of foreign matter adhering to the piston rod 15 during external exposure. The oil lip 73 also maintains the airtightness while being in close contact with the piston rod 15 by the tightening allowance and the tension force of the spring 69. The oil lip 73 scrapes off the oil liquid adhering to the piston rod 15 when the piston rod 15 advances to the outside, restricts the leakage to the outside, and retains the oil liquid in the chamber 85.

The friction member 22 is fitted into the medium diameter hole portion 56 of the rod guide 20. Thus, the friction member 22 is disposed on the inner side of the seal member 21 in the cylinder inward and outward direction, that is, the inside of the cylinder 19. The inner peripheral portion of the friction member 22 comes into press-contact with the outer peripheral surface 37 of the main shaft portion 38 of the piston rod 15 and generates a frictional resistance for the piston rod 15. Additionally, in FIGS. 2 and 3, a state in which the piston rod 15 is excluded is shown and the friction member 22 is in a natural state before the piston rod 15 is inserted. In other words, the natural state of the friction member 22 is a state before fitted to the piston rod 15. Then, the outer peripheral surface 37 of the main shaft portion 38 of the piston rod 15 when inserted is indicated by a virtual line (two-dotted chain line).

As shown in FIG. 2, the friction member 22 is an integrally molded product including an annular elastic rubber portion 91 which is formed of an elastic rubber material such as nitrile rubber or fluororubber, and a metallic annular base portion 92 to which the elastic rubber portion 91 is fixed. The friction member 22 is fitted into the medium diameter hole portion 56 of the rod guide 20 in the base portion 92 and slidably contacts to the outer peripheral surface 37 of the main shaft portion 38 of the piston rod 15 at the elastic rubber portion 91. The base portion 92 maintains the shape of the elastic rubber portion 91 and imparts a fixing strength to the rod guide 20.

A communication path 95 is formed between the medium diameter hole portion 56 of the rod guide 20 and the friction member 22 while fitting the friction member 22 by the communication groove 58 formed in the medium diameter hole portion 56. The communication path 95 allows the small diameter hole portion 57 of the rod guide 20 to communicate with the side of the large diameter hole portion 55. That is, the communication path 95 allows a chamber 96 formed on the side of the medium diameter hole portion 56 in relation to the collar 62 in the small diameter hole portion 57 to communicate with the chamber 85 on the side of the large diameter hole portion 55 at all times and decreases a pressure difference therebetween. In other words, the communication path 95 allows both sides of the friction member 22 in the axial direction to communicate with each other to decrease the pressure difference between both sides of the friction member 22 in the axial direction.

The chamber 96 in the small diameter hole portion 57 communicates with the chamber 16 through a minute gap between the collar 62 and the piston rod 15. Thus, the chamber 96 communicates with the chamber 85 and the chamber 16 through the communication path 95 to decrease a pressure difference therebetween. Thus, the friction member 22 does not actively serve as a seal.

Additionally, a communication path for minimizing a pressure difference between both sides in the axial direction may be provided in the inner periphery of the friction member 22 instead of or in addition to the communication path 95. Further, the communication path 95 may not be in a communication state at all times and a check valve from the inside to the outside of the cylinder 19 may be provided. The friction member 22 may not serve as a perfect seal.

Figure 3:
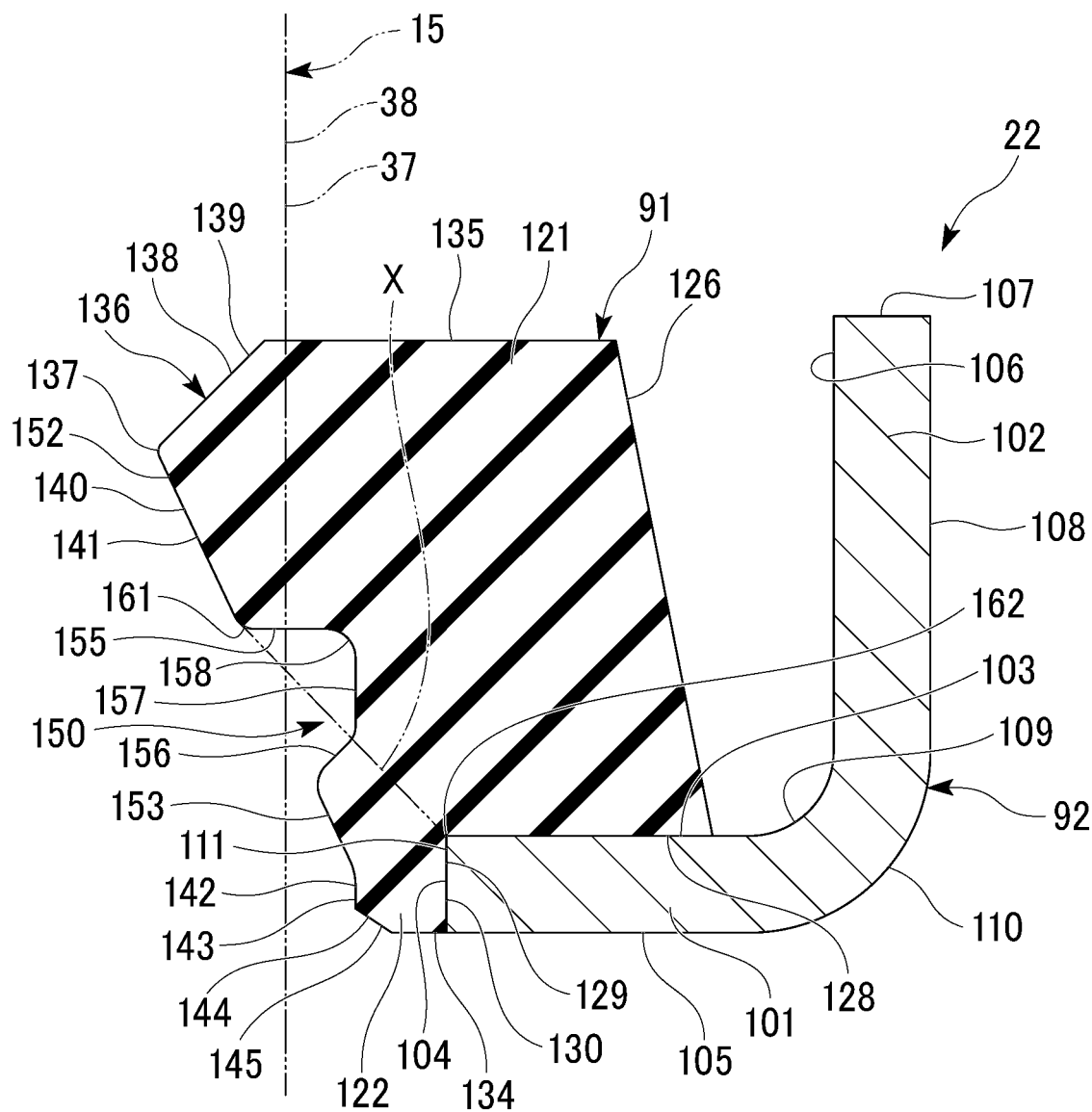
FIG. 3 is a one-sided cross-sectional view showing a friction member of the shock absorber according to the first embodiment of the present invention.

The friction member 22 in a natural state will be described mainly with reference to FIG. 3. As shown in a one-sided cross-section of FIG. 3, the friction member 22 has a bottomed cylindrical shape in which the base portion 92 includes a flat perforated disk-shaped annular disk portion 101 and a cylindrical fixed portion 102 extending from the outer peripheral side of the annular disk portion 101 to one side in the axial direction. The fixed portion 102 extends in the axial direction with the annular disk portion 101 as a base end and is formed coaxially with the annular disk portion 101. The fixed portion 102 extends to only one side in the axial direction from the outer peripheral side of the annular disk portion 101. The center axes of the annular disk portion 101 and the fixed portion 102 are aligned with each other. The fixed portion 102 extends perpendicularly to the annular disk portion 101. The base portion 92 is formed of, for example, a flat material by, for example, press molding.

The annular disk portion 101 includes an inner bottom surface 103 which is formed by a circular flat surface on the side of the fixed portion 102 in the axial direction, an inner end surface 104 which is formed by a cylindrical surface on the side opposite to the fixed portion 102 in the radial direction, and an outer bottom surface 105 which is formed by a circular flat surface on the side opposite to the fixed portion 102 in the axial direction. The inner peripheral end portion of the inner bottom surface 103 is connected to one end portion of the inner end surface 104 in the axial direction. The inner peripheral end portion of the outer bottom surface 105 is connected to the other end portion of the inner end surface 104 in the axial direction.

The fixed portion 102 includes an inner peripheral surface 106 which is formed by a cylindrical surface on the side of the annular disk portion 101 in the radial direction, a front end surface 107 which is formed by a circular flat surface on the side opposite to the annular disk portion 101 in the axial direction, and an outer peripheral surface 108 which is formed by a cylindrical surface on the side opposite to the annular disk portion 101 in the radial direction. An end portion of the inner peripheral surface 106 on the side opposite to the annular disk portion 101 in the axial direction is connected to the inner diameter portion of the front end surface 107. An end portion of the outer peripheral surface 108 on the side opposite to the annular disk portion 101 in the axial direction is connected to the outer diameter portion of the front end surface 107. The fixed portion 102 includes an annular inner R-chamfer 109 on the side close to the inner bottom surface 103 and the inner peripheral surface 106. The fixed portion 102 also includes an annular outer R-chamfer 110 on the side close to the outer bottom surface 105 and the outer peripheral surface 108.

In the base portion 92, the center axes of the inner bottom surface 103, the inner end surface 104, the outer bottom surface 105, the inner peripheral surface 106, the front end surface 107, the outer peripheral surface 108, the inner R-chamfer 109, and the outer R-chamfer 110 are aligned with each other. The inner bottom surface 103, the outer bottom surface 105, and the front end surface 107 extend to be orthogonal to the center axes. The inner end having the smallest diameter of the base portion 92 serves as the inner end surface 104 of the annular disk portion 101. Thus, the inner end surface 104 has the smallest diameter also in the annular disk portion 101 of the base portion 92. An inner peripheral portion 111 of the annular disk portion 101 includes the inner end surface 104 and serves as the inner peripheral portion 111 of the base portion 92.

The elastic rubber portion 91 has an annular shape so that the center axis is aligned with the base portion 92. The elastic rubber portion 91 includes a main body portion 121 which is formed on the inner side of the fixed portion 102 of the base portion 92 in the radial direction and the side of the fixed portion 102 in the axial direction of the annular disk portion 101 and an inner covering portion 122 which protrudes outward in the axial direction from the end portion on the side of the annular disk portion 101 in the axial direction of the inner peripheral portion of the main body portion 121 and is formed on the inner peripheral side of the annular disk portion 101.

In the main body portion 121, an outer peripheral surface 126 is entirely separated inward in the radial direction from the inner peripheral surface 106 of the fixed portion 102 of the base portion 92. The main body portion 121 is fixed to the inner bottom surface 103 of the annular disk portion 101 of the base portion 92 by a base end side fixing surface 128 connected to one side of the outer peripheral surface 126 in the axial direction. The outer peripheral surface 126 has a tapered shape in which a diameter increases toward the base end side fixing surface 128 in the axial direction and is exposed without being fixed to the base portion 92. Thus, the elastic rubber portion 91 overlaps the inner peripheral side of the cylindrical fixed portion 102 in the axial direction as a whole while being separated therefrom in the radial direction as a whole.

The inner covering portion 122 is fixed to the inner end surface 104 of the annular disk portion 101 of the base portion 92 by an inner peripheral fixing surface 129 connected to the side opposite to the outer peripheral surface 126 of the base end side fixing surface 128. In the elastic rubber portion 91, a portion which is contact with the base portion 92 is entirely fixed to the base portion 92. In the inner covering portion 122, an inner peripheral connection portion 130 including the inner peripheral fixing surface 129 is connected to the inner peripheral portion 111 of the annular disk portion 101.

The elastic rubber portion 91 includes an end surface 134 which is provided at an end portion on the side opposite to the main body portion 121 of the inner covering portion 122 to be exposed without being fixed to the base portion 92. The end surface 134 is flush with the outer bottom surface 105 of the annular disk portion 101. The elastic rubber portion 91 includes a front end surface 135 which is exposed without being fixed to the base portion 92 in the direction opposite to the base end side fixing surface 128 of the main body portion 121 in the axial direction. Further, the elastic rubber portion 91 also includes an inner peripheral surface 136 which is provided on the inner peripheral side of the main body portion 121 and the inner covering portion 122 to be exposed without being fixed to the base portion 92.

The elastic rubber portion 91 includes a minimum inner diameter portion 137 of which an inner peripheral portion has the smallest diameter in the elastic rubber portion 91 and has the smallest diameter also in the friction member 22, a front end side tapered portion 139 which includes a tapered inner peripheral surface 138 increasing in diameter so that a diameter increases as it goes away from the minimum inner diameter portion 137 in a direction from the minimum inner diameter portion 137 toward the front end surface 135 in the axial direction, and a tapered base end side tapered portion 141 which includes a tapered inner peripheral surface 140 increasing in diameter so that a diameter increases as it goes away from the minimum inner diameter portion 137 in a direction from the minimum inner diameter portion 137 toward the side opposite to the front end surface 135 in the axial direction.

Further, the elastic rubber portion 91 includes a constant diameter portion 143 which includes a cylindrical inner peripheral surface 142 whose inner peripheral portion is connected to the side of the inner peripheral surface 140 opposite to the minimum inner diameter portion 137 and a tapered portion 145 which includes a tapered inner peripheral surface 144 increasing in diameter so that a diameter increases as it goes away from the inner peripheral surface 142 and provided on the side opposite to the inner peripheral surface 140 of the inner peripheral surface 142. The inner peripheral surface 144 is connected to the end surface 134. The elastic rubber portion 91 includes the inner peripheral connection portion 130 which includes the minimum inner diameter portion 137 on the inner peripheral side and is connected to the inner peripheral portion 111 of the annular disk portion 101.

In other words, the minimum inner diameter portion 137, the front end side tapered portion 139 and the base end side tapered portion 141 on both sides of the minimum inner diameter portion 137 in the axial direction, the constant diameter portion 143, and the tapered portion 145 are provided on the inner peripheral side of the elastic rubber portion 91. A boundary portion between the front end side tapered portion 139 and the base end side tapered portion 141 serves as the minimum inner diameter portion 137. In the front end side tapered portion 139 and the base end side tapered portion 141, the front end side tapered portion 139 is disposed on the side away from the annular disk portion 101 in the base portion 92 and the base end side tapered portion 141 is disposed on the side close to the annular disk portion 101 in the axial direction of the elastic rubber portion 91. Further, in other words, the minimum inner diameter portion 137, the front end side tapered portion 139 increasing in diameter from the minimum inner diameter portion 137 toward the side opposite to the chamber 16, and the base end side tapered portion 141 increasing in diameter from the minimum inner diameter portion 137 toward the chamber 16 are provided on the inner peripheral side of the elastic rubber portion 91.

All of the minimum inner diameter portion 137, the front end side tapered portion 139, the base end side tapered portion 141, the constant diameter portion 143, and the tapered portion 145 are formed in an annular shape to be continuous over the entire circumference in the circumferential direction of the elastic rubber portion 91. Since the center axis of the elastic rubber portion 91 is aligned with the center axis of the base portion 92, the center axes of the outer peripheral surface 126, the front end surface 135, the inner peripheral surface 138, the minimum inner diameter portion 137, the inner peripheral surface 140, the inner peripheral surface 142, and the inner peripheral surface 144 are aligned with the center axis of the base portion 92.

A protrusion suppression structure portion 150 which suppresses the protruding of the inner peripheral surface 140 formed from the minimum inner diameter portion 137 toward the inner peripheral connection portion 130 is provided on the inner peripheral side between the minimum inner diameter portion 137 and the inner peripheral connection portion 130 in the axial direction of the elastic rubber portion 91. The protrusion suppression structure portion 150 is a recess which is recessed outward in the radial direction from the middle position of the inner peripheral surface 140 in the axial direction.

The protrusion suppression structure portion 150 linearly extends and is formed on the inner peripheral surface 140 over the entire circumference. The protrusion suppression structure portion 150 is formed in an endless annular shape of which the center axis is aligned with that of the inner peripheral surface 140. In other words, the protrusion suppression structure portion 150 is continuous over the entire circumference in the circumferential direction of the elastic rubber portion 91. The protrusion suppression structure portion 150 is recessed from the inner peripheral surface 140 by a constant depth regardless of the circumferential position.

Since the protrusion suppression structure portion 150 is provided at the middle position in the axial direction, the inner peripheral surface 140 is divided into a partial surface portion 152 which is on the side of the minimum inner diameter portion 137 in the axial direction in relation to the protrusion suppression structure portion 150 and a partial surface portion 153 which is on the side opposite to the minimum inner diameter portion 137 in the axial direction in relation to the protrusion suppression structure portion 150, that is, the side of the inner peripheral connection portion 130.

The entire protrusion suppression structure portion 150 is formed in the range of the fixed portion 102 in the axial direction. In other words, the entire protrusion suppression structure portion 150 is formed to be offset from the annular disk portion 101 in the axial direction. The protrusion suppression structure portion 150 includes a flat front end side surface portion 155 which is widened outward in the radial direction from the end edge portion on the side of the protrusion suppression structure portion 150 in the partial surface portion 152, a tapered base end side surface portion 156 which is widened outward in the radial direction and toward the partial surface portion 152 in the axial direction from the end edge portion on the side of the protrusion suppression structure portion 150 in the partial surface portion 153, a cylindrical surface portion 157 which extends toward the partial surface portion 152 in the axial direction from the end edge portion on the side opposite to the partial surface portion 153 of the base end side surface portion 156, and an annular R-chamfer 158 which is provided between the front end side surface portion 155 and the cylindrical surface portion 157.

The center axes of the front end side surface portion 155, the base end side surface portion 156, the cylindrical surface portion 157, and the R-chamfer 158 are aligned with the center axis of the inner peripheral surface 140. The cylindrical surface portion 157 has the same diameter as that of the inner peripheral surface 142 of the constant diameter portion 143 and is disposed on the same cylindrical surface as that of the inner peripheral surface 142. Thus, the protrusion suppression structure portion 150 is formed such that the diameter of the cylindrical surface portion 157 having the largest diameter is smaller than that of the inner peripheral fixing surface 129 of the inner peripheral connection portion 130.

In a natural state in which the friction member 22 is not fitted to the piston rod 15, the protrusion suppression structure portion 150 extends from the inner peripheral surface 140 to a line segment connecting the inner peripheral connection portion 130 and the end portion 161 on the side of the inner peripheral connection portion 130 in the partial surface portion 152. More specifically, the protrusion suppression structure portion 150 extends from the inner peripheral surface 140 to a line segment X connecting an end portion 161 on the side of the inner peripheral connection portion 130 in the axial direction of the partial surface portion 152 and an end portion 162 on the side of the minimum inner diameter portion 137 in the axial direction of the inner peripheral fixing surface 129. Further, the protrusion suppression structure portion 150 extends from the inner peripheral surface 140 to a line segment connecting the minimum inner diameter portion 137 and the end portion 162 of the inner peripheral fixing surface 129 and extends inward in the radial direction in relation to the line segment.

The protrusion suppression structure portion 150 and all of the front end side surface portion 155, the base end side surface portion 156, the cylindrical surface portion 157, and the R-chamfer 158 constituting the protrusion suppression structure portion are continuous over the entire circumference in the circumferential direction of the elastic rubber portion 91. In other words, they have an endless annular shape and their center axes are aligned with that of the base portion 92.

In the friction member 22, the inner diameter of the minimum inner diameter portion 137 is smaller than the outer diameter of the main shaft portion 38 of the piston rod 15, that is, the diameter of the outer peripheral surface 37. The friction member 22 is fitted to the main shaft portion 38 of the piston rod 15 with a tightening allowance. In the friction member 22, the minimum inner diameter of the base end side surface portion 156 of the protrusion suppression structure portion 150, that is, the minimum inner diameter of the partial surface portion 153 is larger than the outer diameter of the main shaft portion 38, that is, the diameter of the outer peripheral surface 37.

The friction member 22 fitted to the piston rod 15 is provided at a position in which a portion on the side of the cylindrical surface portion 157 on the back side of the recess of the protrusion suppression structure portion 150 is separated from the piston rod 15 at all times. In other words, the friction member 22 fitted to the piston rod 15 is provided at a position in which the protrusion suppression structure portion 150 is partially separated from the piston rod 15 in the radial direction. Further, the friction member 22 fitted to the piston rod 15 is provided at a position in which the base end side surface portion 156, the partial surface portion 153, and the inner peripheral surfaces 142 and 144 of the protrusion suppression structure portion 150 are separated from the piston rod 15 at all times. Further, the friction member 22 fitted to the piston rod 15 is provided at a position in which the elastic rubber portion 91 is separated from the fixed portion 102 of the base portion 92 at all times.

As shown in FIG. 2, the friction member 22 with the above-described structure is fitted and fixed to the medium diameter hole portion 56 which is a fixed target portion from the side of the large diameter hole portion 55 of the rod guide 20 in a posture in which the fixed portion 102 of the base portion 92 protrudes outward in the cylinder inward and outward direction from the annular disk portion 101 of the base portion 92. At this time, in the friction member 22, the fixed portion 102 of the base portion 92 is fitted to the inner peripheral surface of the medium diameter hole portion 56 in the outer peripheral surface 108 and the annular disk portion 101 is in contact with the bottom surface of the medium diameter hole portion 56 in the outer bottom surface 105. At the inner peripheral side of the elastic rubber portion 91, the front end side tapered portion 139 is disposed on the outer side of the minimum inner diameter portion 137 in the cylinder inward and outward direction and the base end side tapered portion 141 is disposed on the inner side of the minimum inner diameter portion 137 in the cylinder inward and outward direction. In this way, the base portion 92 includes the cylindrical fixed portion 102 for fixing the friction member 22 to the medium diameter hole portion 56 of the rod guide 20 which is a target portion.

Then, the main shaft portion 38 of the piston rod 15 is inserted through the elastic rubber portion 91 of the friction member 22 with a predetermined tightening allowance. Thus, the elastic rubber portion 91 of the friction member 22 comes into close contact with the main shaft portion 38 of the piston rod 15 while being elastically deformed outward in the radial direction.

Figure 4:
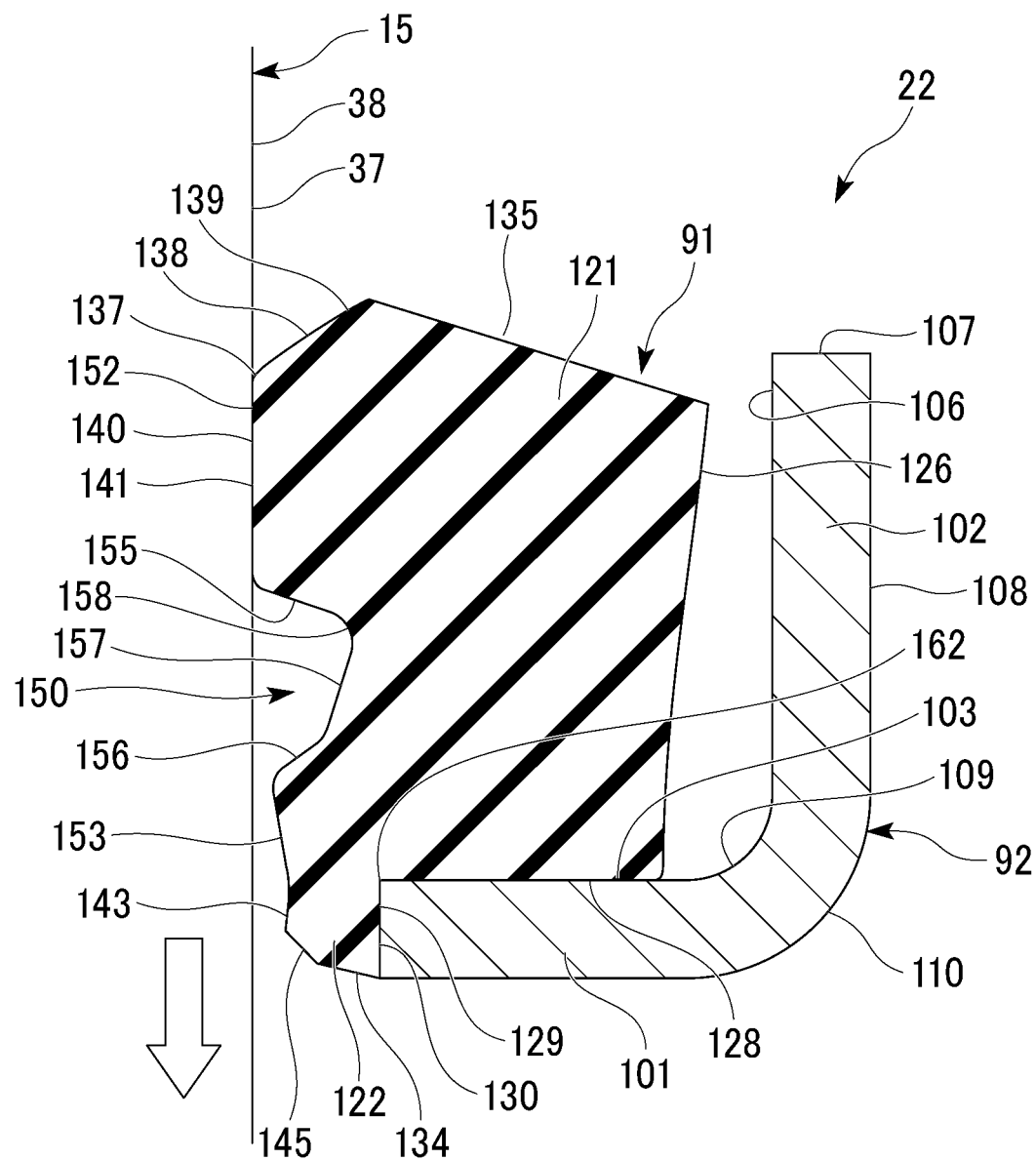
FIG. 4 is a one-sided cross-sectional view showing a deformed state of the friction member of the shock absorber according to the first embodiment of the present invention in a contraction stroke.
Figure 5:
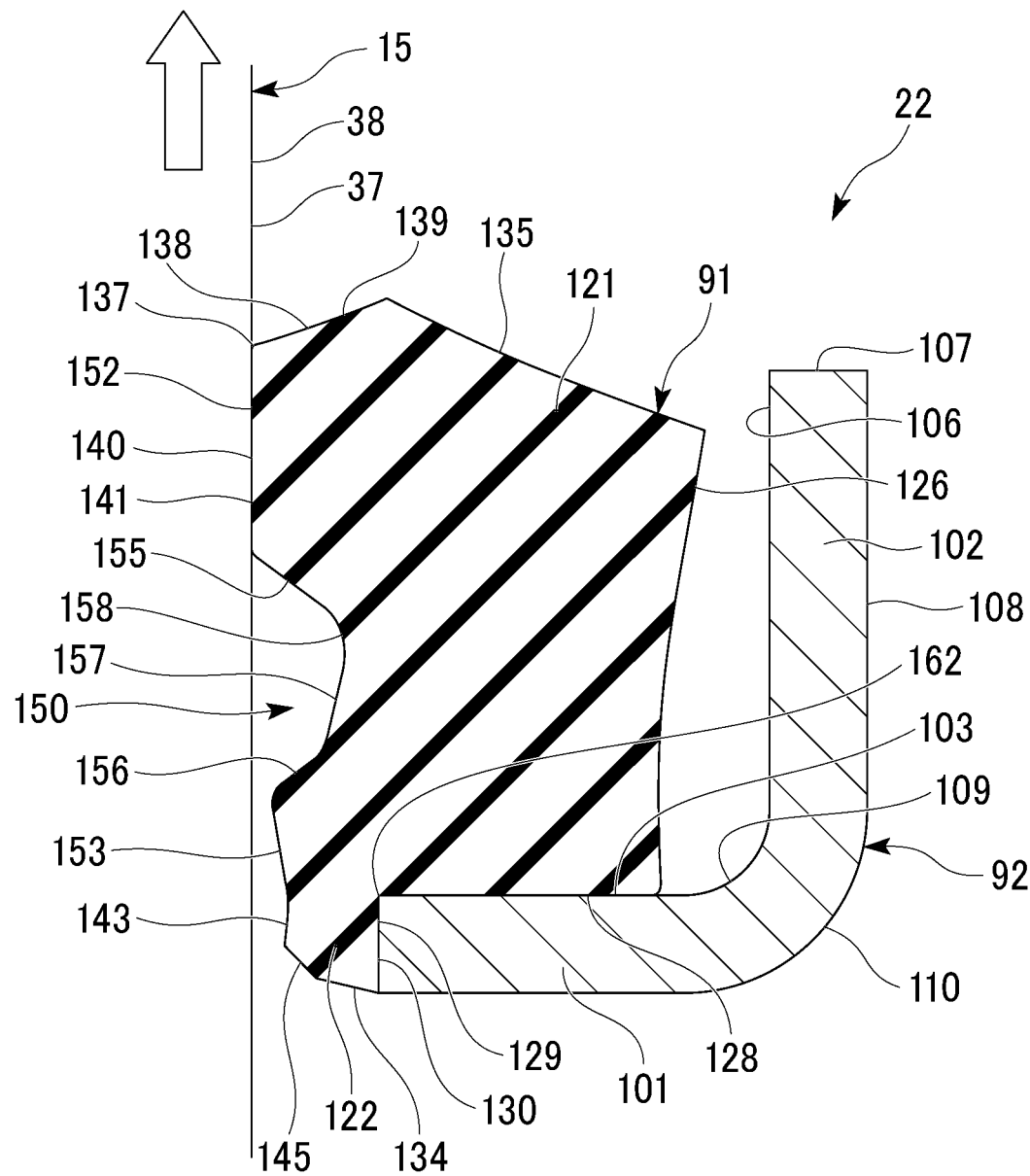
FIG. 5 is a one-sided cross-sectional view showing a deformed state of the friction member of the shock absorber according to the first embodiment of the present invention in an extension stroke.

FIG. 4 shows a deformed state of the elastic rubber portion 91 of the friction member 22 when the fitted piston rod 15 moves to the contraction side. FIG. 5 shows a deformed state of the elastic rubber portion 91 when the fitted piston rod 15 moves to the extension side. As shown in FIGS. 4 and 5, the friction member 22 comes into close contact with the main shaft portion 38 of the piston rod 15 by the minimum inner diameter portion 137 of the elastic rubber portion 91 and the partial surface portion 152 on the side of the minimum inner diameter portion 137 in relation to the protrusion suppression structure portion 150 of the base end side tapered portion 141. The elastic rubber portion 91 is deformed with the end portion 162 on the side of the base end side fixing surface 128 in the inner peripheral connection portion 130 as a fulcrum in accordance with the movement of the main shaft portion 38 of the piston rod 15.

When the piston rod 15 moves in the cylinder inward and outward direction, the elastic rubber portion 91 is elastically deformed and then slidably contacts to the piston rod 15. At that time, the friction member 22 adjusts the friction characteristics.

As shown in FIG. 4, when the piston rod 15 moves to the contraction side where the entire length of the shock absorber 11 decreases, the elastic rubber portion 91 is deformed so that the front end side surface portion 155 of the protrusion suppression structure portion 150 moves closer to the base end side surface portion 156. Accordingly, when the protrusion suppression structure portion 150 is not provided, a rubber portion provided in the portion of the protrusion suppression structure portion 150 is compressed so that the rigidity of the elastic rubber portion increases. However, since the elastic rubber portion 91 is provided with the protrusion suppression structure portion 150, the amount of the compressed portion is small and hence the axial rigidity decreases.

As shown in FIG. 5, when the piston rod 15 moves to the extension side where the entire length of the shock absorber 11 increases, the elastic rubber portion 91 is deformed so that the front end side surface portion 155 of the protrusion suppression structure portion 150 moves away from the base end side surface portion 156. Accordingly, when the protrusion suppression structure portion 150 is not provided, the rubber portion provided in the portion of the protrusion suppression structure portion 150 protrudes so that the rigidity increases. However, since the elastic rubber portion 91 is provided with the protrusion suppression structure portion 150, the amount of the protruding portion is small and hence the axial rigidity decreases.

When the piston rod 15 moves to the contraction side, a portion on the side of the piston 18 in the main shaft portion 38 of the piston rod 15 enters the oil liquid in the inner cylinder 12. Then, when the piston rod 15 moves to the extension side, the portion entered in the oil liquid passes through the rod guide 20, the friction member 22, and the seal member 21 shown in FIG. 2 and moves to the outside of the cylinder 19. At that time, the oil liquid adheres to the outer peripheral surface 37 of the main shaft portion 38, but the oil liquid is finally scraped off by the oil lip 73 of the seal member 21 to be retained in the chamber 85.

In the friction member 22, the outer peripheral surface 126 and the front end surface 135 of the elastic rubber portion 91 constitute the chamber 85. The front end side surface portion 155, the base end side surface portion 156, the cylindrical surface portion 157, and the R-chamfer 158 of the protrusion suppression structure portion 150, the partial surface portion 153 of the base end side tapered portion 141, the inner peripheral surface 142 of the constant diameter portion 143, and the inner peripheral surface 144 of the tapered portion 145 shown in FIG. 3 constitute the chamber 96 shown in FIG. 2. For this reason, the friction member 22 contacts the oil liquid of the chamber 85 at a position on the side of the front end surface 135 and contacts the oil liquid of the chamber 96 at a position on the side of the tapered portion 145.

As described above, when the piston rod 15 moves to the contraction side, the shock absorber 11 of the first embodiment generates a damping force of orifice characteristics in a region in which the piston speed is low by using a fixed orifice (not shown) and generates a damping force of valve characteristics in a region in which the piston speed is high by that the disk valve 41 separates away from the piston 18. Further, when the piston rod 15 moves to the extension side, the shock absorber generates a damping force of orifice characteristics in a region in which the piston speed is low by using a fixed orifice (not shown) and generates a damping force of valve characteristics in a region in which the piston speed is high by that the disk valve 42 separates away from the piston 18.

In a region in which the piston speed is further lower than the hydraulic damping region in which the fixed orifice (not shown) and the disk valves 41 and 42 generate a hydraulic damping force, basically almost no damping force is generated by the fixed orifice (not shown) and the disk valves 41 and 42. For this reason, the elastic force and the frictional resistance of the seal member 21 and the friction member 22 to the piston rod 15 and the frictional resistance of the piston 18 to the inner cylinder 12 which are always generated are main factors of the damping force. In such a friction region, the acting force on the piston rod 15, that is, the axial force can be optimized by setting the friction member 22.

Patent Literature 1 described above discloses a liquid pressure shock absorber provided with a friction member slidably contacting on a piston rod and a communication path allowing both sides of the friction member in the axial direction to communicate with each other. Further, Patent Literature 2 described above discloses such a friction member including an annular elastic rubber portion and a metallic base portion including a perforated disk-shaped bottom portion and a cylindrical tubular portion.

Incidentally, there is a demand to decrease the axial rigidity (dynamic friction force) of the friction member while maintaining the axial force (tension force, static friction force) of the friction member. For example, if the rigidity of the friction member is decreased by decreasing the tightening allowance for the piston rod, extending the axial length of the elastic rubber portion, changing the material, or the like, the axial force also decreases at the same time.

In the shock absorber 11 of the first embodiment, the protrusion suppression structure portion 150 which suppresses the protruding of the inner peripheral surface 140 formed from the minimum inner diameter portion 137 toward the inner peripheral connection portion 130 is formed between the minimum inner diameter portion 137 of the elastic rubber portion 91 of the friction member 22 and the inner peripheral connection portion 130 serving as a fulcrum of the deformation of the elastic rubber portion 91. For this reason, since the elastic rubber portion 91 moves easily even when the piston rod 15 moves to any one of the extension side and the contraction side, the axial rigidity can be decreased. On the other hand, even when the protrusion suppression structure portion 150 is formed, it is possible to maintain the axial force applied from the friction member 22 to the piston rod 15 by adjusting the tightening allowance of the elastic rubber portion 91 to the piston rod 15 to increase. Accordingly, it is possible to decrease the rigidity while maintaining the steering stability due to the axial force to improve the operability at the time of protrusion input. In contrast, it is possible to increase the axial force applied from the friction member 22 to the piston rod 15 while maintaining the axial rigidity of the friction member 22. Thus, preferable operating characteristics can be obtained.

Figure 6:
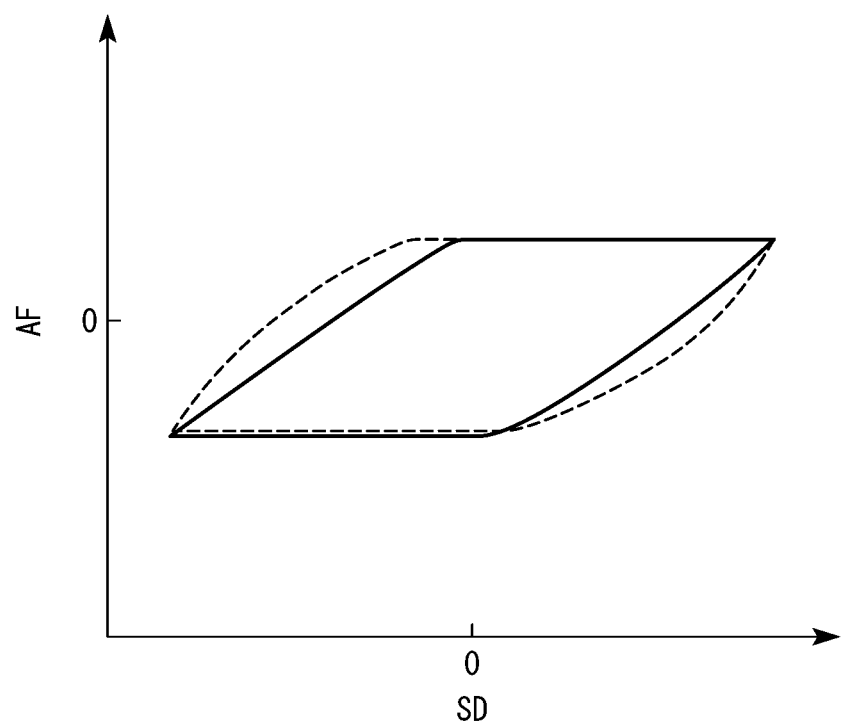
FIG. 6 is a Lissajous waveform diagram of the friction member of the shock absorber according to the first embodiment of the present invention and a comparative example.

FIG. 6 shows a Lissajous waveform diagram of the friction member of the shock absorber according to this embodiment and a comparative example. In FIG. 6, a vertical axis indicates an axial force (AF) and a horizontal axis indicates a sliding displacement (SD). The Lissajous waveform indicated by a solid line in FIG. 6 shows the characteristic of the friction member 22 of the first embodiment provided with the protrusion suppression structure portion 150. In contrast, the Lissajous waveform indicated by a dashed line in FIG. 6 shows the characteristic of the friction member of the comparative example with which the protrusion suppression structure portion 150 is not provided.

The friction member 22 of the first embodiment indicated by a solid line in FIG. 6 can maintain an axial force (AF) which is substantially the same as that of the friction member of the comparative example indicated by a dashed line in FIG. 6. Then, since the friction member 22 of the first embodiment indicated by a solid line in FIG. 6 decreases the axial rigidity more than the friction member of the comparative example indicated by a dashed line in FIG. 6, the change rate of the axial force (AF) with respect to the sliding displacement (SD) can be smaller than that of the friction member of the comparative example indicated by a dashed line in FIG. 6.

Further, since the protrusion suppression structure portion 150 is the recess provided in the inner peripheral surface 140, it is possible to satisfactorily decrease the axial rigidity while maintaining the axial force applied from the friction member 22 to the piston rod 15 or increase the axial force using the friction member 22 while maintaining the axial rigidity of the friction member 22. Thus, even better operating characteristics can be obtained.

Further, since the protrusion suppression structure portion 150 is provided in the inner peripheral surface 140 over the entire circumference in an annular shape, it is possible to satisfactorily decrease the axial rigidity while maintaining the axial force applied from the friction member 22 to the piston rod 15 or increase the axial force using the friction member 22 while maintaining the axial rigidity of the friction member 22. Thus, even better operating characteristics can be obtained.

Further, the friction member 22 is provided at a position in which the protrusion suppression structure portion 150 is separated from the piston rod 15 while being fitted to the piston rod 15. For this reason, it is possible to satisfactorily decrease the axial rigidity while maintaining the axial force applied to the piston rod 15 or increase the axial force using the friction member 22 while maintaining the axial rigidity of the friction member 22. Thus, even better operating characteristics can be obtained.

Further, since the protrusion suppression structure portion 150 extends to a line segment connecting the inner peripheral connection portion 130 and the end portion 161 on the side of the inner peripheral connection portion 130 in the partial surface portion 152 of the inner peripheral surface 140 in a natural state of the friction member 22, it is possible to satisfactorily decrease the axial rigidity while maintaining the axial force applied to the piston rod 15 or increase the axial force using the friction member 22 while maintaining the axial rigidity of the friction member 22. Thus, even better operating characteristics can be obtained.

Figure 7:
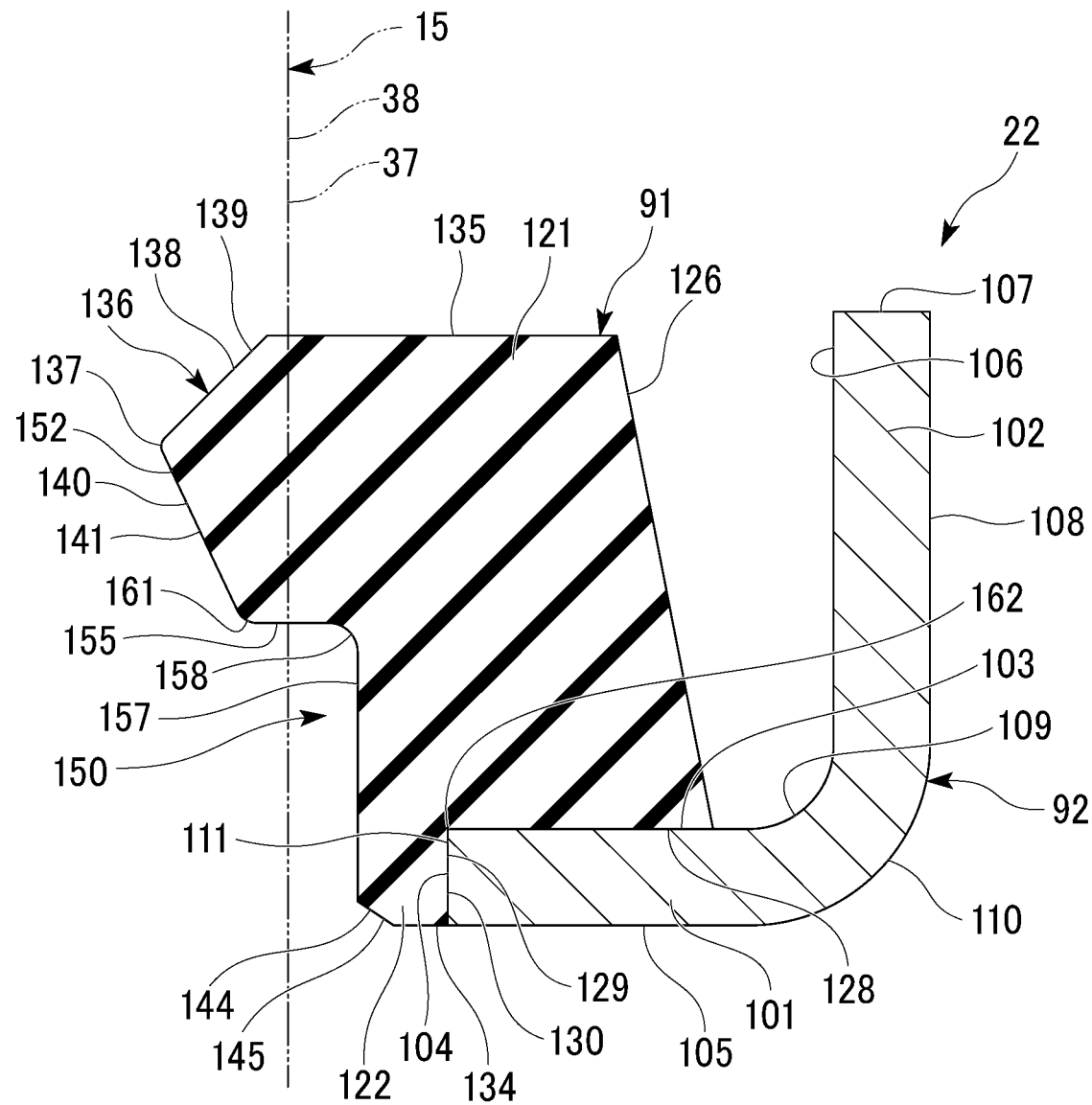
FIG. 7 is a one-sided cross-sectional view showing a modified example of the friction member of the shock absorber according to the first embodiment of the present invention.

Additionally, the first embodiment can be modified as shown in FIG. 7. That is, the cylindrical surface portion 157 of the protrusion suppression structure portion 150 may be extended to the tapered portion 145 to be connected to the inner peripheral surface 144 and the protrusion suppression structure portion 150 may be recessed in a step shape outward in the radial direction from the middle position of the inner peripheral surface 140 in the axial direction to the end portion on the side of the tapered portion 145.

In the first embodiment, the protrusion suppression structure portion 150 which is the recess is provided in the inner peripheral surface 140 over the entire circumference in an annular shape, but may be provided in the inner peripheral surface 140 partially in the circumferential direction. That is, a plurality of the protrusion suppression structure portions 150 which are the arc-shaped recesses may be provided in the inner peripheral surface 140 at intervals in the circumferential direction to be arranged side by side on the same circle. That is, the protrusion suppression structure portion 150 may be provided at least partially in the circumferential direction between the minimum inner diameter portion 137 and the inner peripheral connection portion 130 of the elastic rubber portion 91 and may be a recess which is provided in the inner peripheral surface 140 at least partially in the circumferential direction.

Further, the friction member 22 fitted to the piston rod 15 is provided at a position in which a portion on the side of the cylindrical surface portion 157 on the back side of the recess of the protrusion suppression structure portion 150 is always separated from the piston rod 15, but may be provided at a position in which the entire protrusion suppression structure portion 150 is always separated from the piston rod 15. That is, the friction member 22 may be provided at a position in which the protrusion suppression structure portion 150 is at least partially separated from the piston rod 15 while being fitted to the piston rod 15.

Second Embodiment

Next, a second embodiment according to the present invention will be described mainly with reference to FIG. 8 by focusing on differences from the first embodiment. Additionally, the parts common to the first embodiment are indicated by the same name and the same reference numeral.

Figure 8:
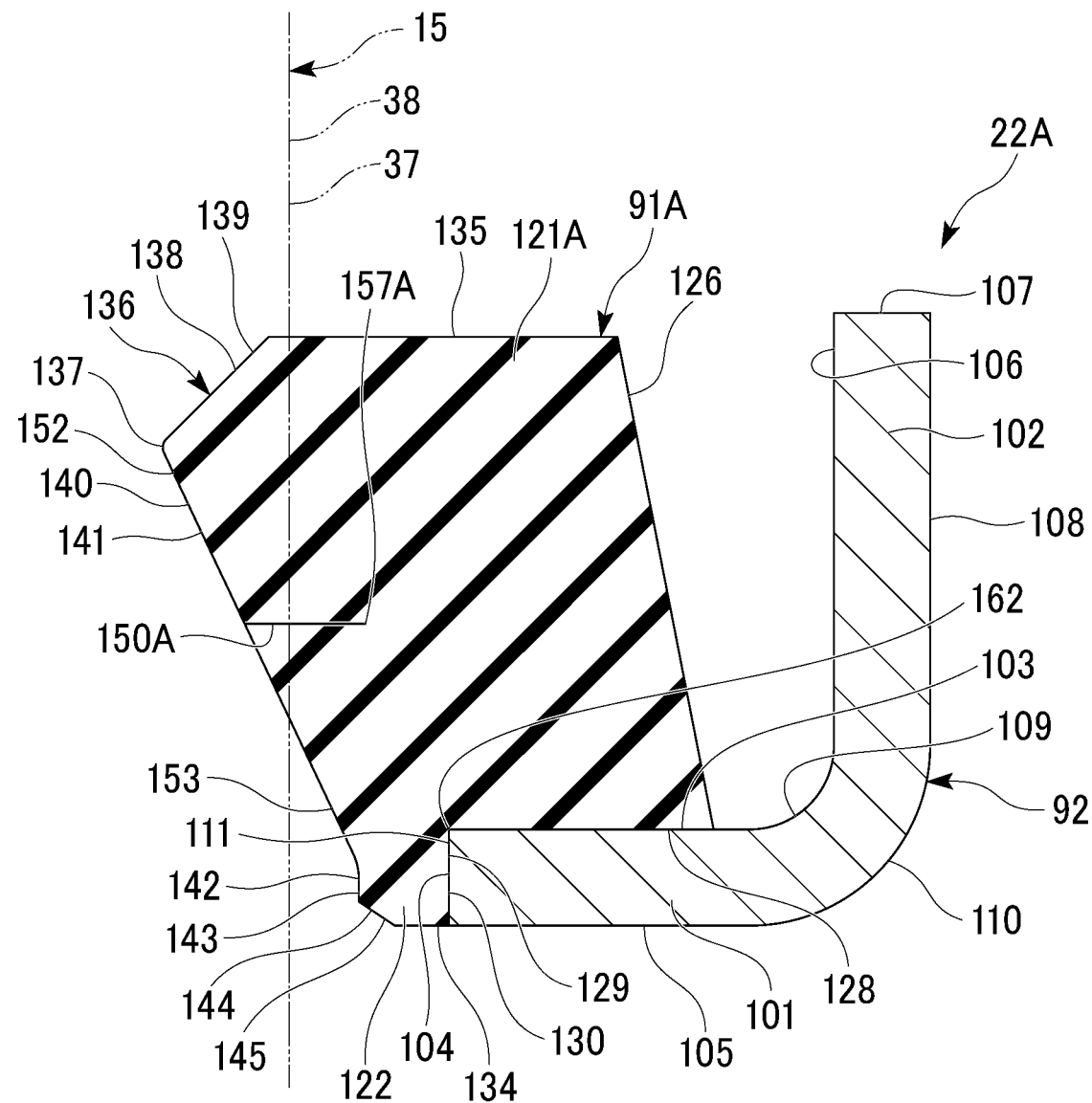
FIG. 8 is a one-sided cross-sectional view showing a friction member of a shock absorber according to a second embodiment of the present invention.

In the second embodiment, a friction member 22A of which a one-sided cross-section is shown in FIG. 8 is provided instead of the friction member 22 of the first embodiment. Additionally, also in FIG. 8, the friction member 22A in a natural state before the piston rod 15 is inserted is shown and the outer peripheral surface 37 of the main shaft portion 38 of the piston rod 15 when inserted is indicated by a virtual line (two-dotted chain line).

The friction member 22A of the second embodiment includes the base portion 92 which is the same as the first embodiment and an elastic rubber portion 91A which is partially different from the elastic rubber portion 91 of the first embodiment. The elastic rubber portion 91A includes a main body portion 121A which is partially different from the main body portion 121 of the first embodiment and the inner covering portion 122 which is the same as the first embodiment.

Instead of the protrusion suppression structure portion 150 of the first embodiment, a protrusion suppression structure portion 150A is provided on the inner peripheral side between the minimum inner diameter portion 137 and the inner peripheral connection portion 130 in the axial direction of the main body portion 121A in order to suppress the protruding of the inner peripheral surface 140. The protrusion suppression structure portion 150A is a notch which is notched outward in the radial direction from the middle position of the inner peripheral surface 140 in the axial direction and is a flat notch which is widened to be orthogonal to the center axis of the friction member 22A. Additionally, the notch is not limited to have a flat surface and may be formed right upward or right downward. The right downward notch is more effective because the rubber is easier to open.

The protrusion suppression structure portion 150A is formed on the inner peripheral surface 140 over the entire circumference thereof. The protrusion suppression structure portion 150A is formed in an endless annular shape of which the center axis is aligned with that of the inner peripheral surface 140. In other words, the protrusion suppression structure portion 150A is continuous over the entire circumference in the circumferential direction of the elastic rubber portion 91A. The protrusion suppression structure portion 150A is notched from the inner peripheral surface 140 by a constant depth regardless of the circumferential position and the center axis thereof is aligned with that of the base portion 92.

Since the protrusion suppression structure portion 150A is provided at the middle position in the axial direction, the inner peripheral surface 140 is divided into the partial surface portion 152 on the side of the minimum inner diameter portion 137 in relation to the protrusion suppression structure portion 150A and the partial surface portion 153 on the side of the inner peripheral connection portion 130, that is, the side opposite to the minimum inner diameter portion 137 in relation to the protrusion suppression structure portion 150A.

The entire protrusion suppression structure portion 150A is formed in the range of the fixed portion 102 in the axial direction. In other words, the entire protrusion suppression structure portion 150A is formed to be offset from the annular disk portion 101 in the axial direction. In the protrusion suppression structure portion 150A, a maximum diameter portion 157A having the largest diameter has the same diameter as that of the inner peripheral surface 142 of the constant diameter portion 143 and is disposed on the same cylindrical surface as the inner peripheral surface 142. Thus, the diameter of the maximum diameter portion 157A of the protrusion suppression structure portion 150A is smaller than that of the inner peripheral fixing surface 129 of the inner peripheral connection portion 130.

In a natural state in which the friction member 22A is not fitted to the piston rod 15, the protrusion suppression structure portion 150A extends from the inner peripheral surface 140 to a line segment connecting the minimum inner diameter portion 137 and the end portion 162 of the inner peripheral connection portion 130.

The friction member 22A fitted to a piston rod 15 is provided at a position in which a portion on the side of the maximum diameter portion 157A on the back side of the notch of the protrusion suppression structure portion 150A is always separated from the piston rod 15. In other words, the friction member 22A is provided at a position in which the protrusion suppression structure portion 150A is partially separated from the piston rod 15 while being fitted to the piston rod 15.

The friction member 22A with the above-described structure is fitted to the medium diameter hole portion 56 of the rod guide 20 at the fixed portion 102 of the base portion 92 similarly to the first embodiment. The main shaft portion 38 of the piston rod 15 is inserted into the elastic rubber portion 91A of the friction member 22A with a predetermined tightening allowance similarly to the first embodiment.

The friction member 22A comes into close contact with the main shaft portion 38 of the piston rod 15 by the minimum inner diameter portion 137 of the elastic rubber portion 91, the partial surface portion 152 between the protrusion suppression structure portion 150A and the minimum inner diameter portion 137 of the base end side tapered portion 141, and the portion of the partial surface portion 153 on the side of the protrusion suppression structure portion 150A on the side opposite to the minimum inner diameter portion 137 in relation to the protrusion suppression structure portion 150A of the base end side tapered portion 141. Then, the axial rigidity of the elastic rubber portion 91A decreases by the protrusion suppression structure portion 150A even when the piston rod 15 moves to any one of the contraction side and the extension side. As a result, preferable operating characteristics can be obtained similarly to the first embodiment.

Additionally, also in the second embodiment, the protrusion suppression structure portion 150A which is the notch may be provided in the inner peripheral surface 140 partially in the circumferential direction. That is, the protrusion suppression structure portion 150A may be also provided between the minimum inner diameter portion 137 and the inner peripheral connection portion 130 of the elastic rubber portion 91A at least partially in the circumferential direction and may be a notch provided in the inner peripheral surface 140 at least partially in the circumferential direction.

Further, the friction member 22A fitted to the piston rod 15 is provided at a position in which a portion on the side of the maximum diameter portion 157A on the back side of the notch of the protrusion suppression structure portion 150A is always separated from the piston rod 15, but may be provided at a position in which the entire protrusion suppression structure portion 150A is always separated from the piston rod 15. That is, the friction member 22A may be provided at a position in which the protrusion suppression structure portion 150A is at least partially separated from the piston rod 15 while being fitted to the piston rod 15.

Third Embodiment

Next, a third embodiment according to the present invention will be described mainly with reference to FIG. 9 by focusing on differences from the first embodiment. Additionally, the parts common to the first embodiment are indicated by the same name and the same reference numeral.

Figure 9:
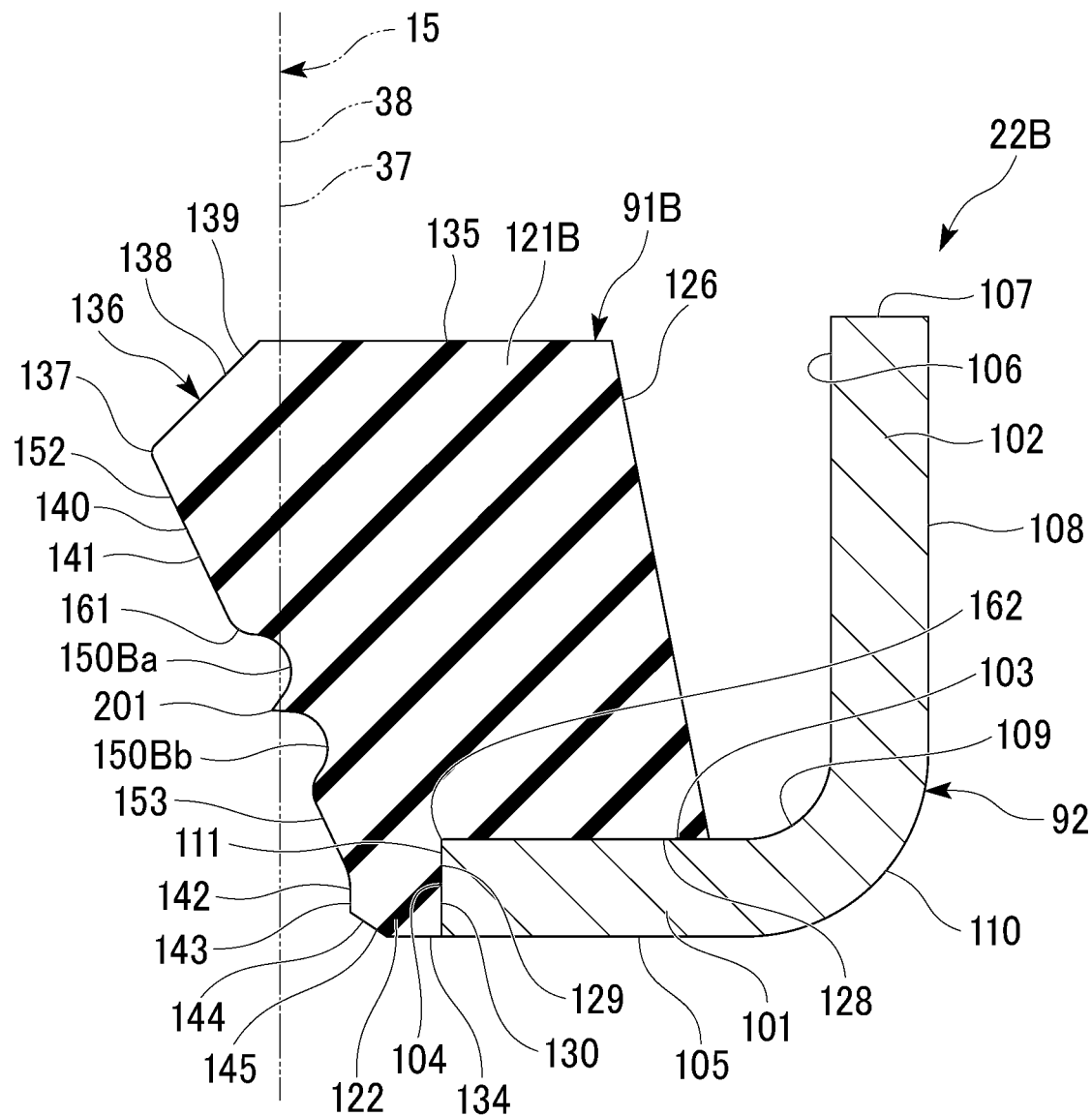
FIG. 9 is a one-sided cross-sectional view showing a friction member of a shock absorber according to a third embodiment of the present invention.

In the third embodiment, a friction member 22B of which a one-sided cross-section is shown in FIG. 9 is provided instead of the friction member 22 of the first embodiment. Additionally, also in FIG. 9, the friction member 22B in a natural state before the piston rod 15 is inserted is shown and the outer peripheral surface 37 of the main shaft portion 38 of the piston rod 15 when inserted is indicated by a virtual line (two-dotted chain line).

The friction member 22B of the third embodiment includes the base portion 92 which is the same as the first embodiment and an elastic rubber portion 91B which is partially different from the elastic rubber portion 91 of the first embodiment. The elastic rubber portion 91B includes a main body portion 121B which is partially different from the main body portion 121 of the first embodiment and the inner covering portion 122 which is the same as the first embodiment.

Instead of the protrusion suppression structure portion 150 of the first embodiment, a plurality of, specifically, two protrusion suppression structure portions 150Ba and 150Bb are provided on the inner peripheral side between the minimum inner diameter portion 137 and the inner peripheral connection portion 130 in the axial direction of the main body portion 121B in order to suppress the protruding of the inner peripheral surface 140. The protrusion suppression structure portions 150Ba and 150Bb are provided separately. All of the protrusion suppression structure portions 150Ba and 150Bb are recesses which are recessed outward in the radial direction from the middle position of the inner peripheral surface 140 in the axial direction. The protrusion suppression structure portions 150Ba and 150Bb have a semi-circular cross section having the same diameter on a plane including the center axis of the friction member 22B. The protrusion suppression structure portions 150Ba and 150Bb are arranged in the axial direction of the friction member 22B and the protrusion suppression structure portion 150Ba is disposed on the side of the front end surface 135 in relation to the protrusion suppression structure portion 150Bb.

All of the protrusion suppression structure portions 150Ba and 150Bb extend linearly and are formed on the inner peripheral surface 140 over the entire circumference thereof. The protrusion suppression structure portions 150Ba and 150Bb are formed in an endless annular shape of which the center axis is aligned with that of the inner peripheral surface 140. In other words, the protrusion suppression structure portions 150Ba and 150Bb are continuous over the entire circumference in the circumferential direction of the elastic rubber portion 91. All of the protrusion suppression structure portions 150Ba and 150Bb are recessed from the inner peripheral surface 140 by a constant depth regardless of the circumferential position and are recessed from the inner peripheral surface 140 by the equal depth. The center axes of the protrusion suppression structure portions 150Ba and 150Bb are aligned with that of the base portion 92.

Since the protrusion suppression structure portions 150Ba and 150Bb are provided at the middle position in the axial direction, the inner peripheral surface 140 is divided into the partial surface portion 152 on the side of the minimum inner diameter portion 137 in relation to the protrusion suppression structure portion 150Ba, the partial surface portion 153 on the side of the inner peripheral connection portion 130, that is, the side opposite to the minimum inner diameter portion 137 in relation to the protrusion suppression structure portion 150Bb, and the partial surface portion 201 between the protrusion suppression structure portions 150Ba and 150Bb.

All of the protrusion suppression structure portions 150Ba and 150Bb are formed in the range of the fixed portion 102 in the axial direction. In other words, all the protrusion suppression structure portions 150Ba and 150Bb are formed to be offset from the annular disk portion 101 in the axial direction.

In a natural state in which the friction member 22B is not fitted to the piston rod 15, the protrusion suppression structure portion 150Ba extends to a line segment connecting the inner peripheral connection portion 130 and the end portion 161 on the side of the inner peripheral connection portion 130 in the partial surface portion 152 and the protrusion suppression structure portion 150Bb extends to a line segment connecting the partial surface portion 201 and the inner peripheral connection portion 130. More specifically, the protrusion suppression structure portion 150Ba extends to a line segment connecting the end portion 161 on the side of the inner peripheral connection portion 130 in the partial surface portion 152 and the end portion 162 on the side of the base end side fixing surface 128 in the inner peripheral fixing surface 129 and the protrusion suppression structure portion 150Bb extends to a line segment connecting the partial surface portion 201 and the end portion 162 of the inner peripheral fixing surface 129.

The friction member 22B fitted to the piston rod 15 is provided at a position in which at least the end portion on the back side of the recess of the protrusion suppression structure portion 150Bb is always separated from the piston rod 15. In other words, the friction member 22B is provided at a position in which the protrusion suppression structure portion 150Bb is partially separated from the piston rod 15 while being fitted to the piston rod 15.

The friction member 22B with the above-described structure is fitted to the medium diameter hole portion 56 of the rod guide 20 at the fixed portion 102 of the base portion 92 similarly to the first embodiment. The main shaft portion 38 of the piston rod 15 is inserted into the elastic rubber portion 91B of the friction member 22B with a predetermined tightening allowance similarly to the first embodiment.

The friction member 22B comes into close contact with the main shaft portion 38 of the piston rod 15 at least by the minimum inner diameter portion 137 of the elastic rubber portion 91B and the partial surface portion 152 of the base end side tapered portion 141. Then, the axial rigidity of the elastic rubber portion 91B is decreased by the protrusion suppression structure portions 150Ba and 150Bb even when the piston rod 15 moves to any one of the contraction side and the extension side. As a result, preferable operating characteristics can be obtained similarly to the first embodiment.

Additionally, also in the third embodiment, each of the protrusion suppression structure portions 150Ba and 150Bb which are recesses may be provided in the inner peripheral surface 140 partially in the circumferential direction. That is, the protrusion suppression structure portions 150Ba and 150Bb may be also provided between the minimum inner diameter portion 137 and the inner peripheral connection portion 130 of the elastic rubber portion 91B at least partially in the circumferential direction and may be recesses which are provided in the inner peripheral surface 140 at least partially in the circumferential direction. One of the protrusion suppression structure portions 150Ba and 150Bb may be provided in the inner peripheral surface 140 in an annular shape to be continuous in the circumferential direction and the other may be provided in the inner peripheral surface 140 partially in the circumferential direction.

Further, the friction member 22B fitted to the piston rod 15 is provided at a position in which at least the end portion on the back side of the recess of the protrusion suppression structure portion 150Bb is always separated from the piston rod 15, but may be provided at a position in which at least the entire protrusion suppression structure portion 150Bb is always separated from the piston rod 15. That is, the friction member 22B may be provided at a position in which the protrusion suppression structure portion 150Bb is at least partially separated from the piston rod 15 while being fitted to the piston rod 15.

Additionally, a plurality of the protrusion suppression structure portions 150A which are the notches of the second embodiment may be provided side by side in the axial direction of the friction member 22A similarly to the protrusion suppression structure portions 150Ba and 150Bb of the third embodiment.

Fourth Embodiment

Next, a fourth embodiment according to the present invention will be described manly with reference to FIG. 10 by focusing on differences from the first embodiment. Additionally, the parts common to the first embodiment are indicated by the same name and the same reference numeral.

Figure 10:
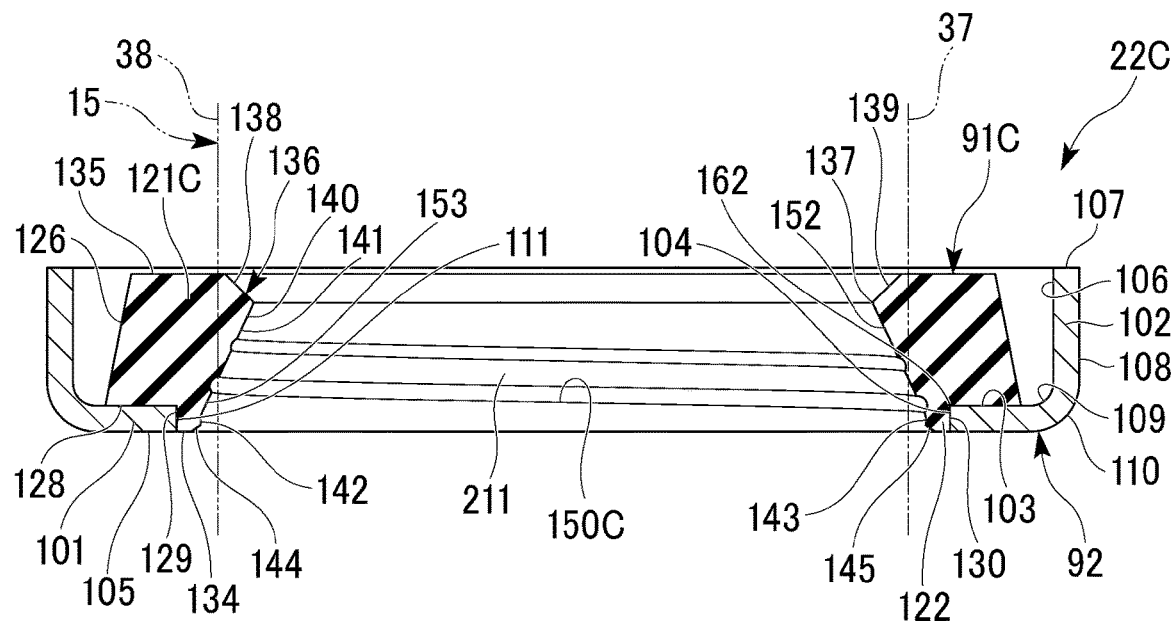
FIG. 10 is a cross-sectional view showing a friction member of a shock absorber according to a fourth embodiment of the present invention.

In the fourth embodiment, a friction member 22C of which a cross-section is shown in FIG. 10 is provided instead of the friction member 22 of the first embodiment. Additionally, also in FIG. 10, the friction member 22C in a natural state before the piston rod 15 is inserted is shown and the outer peripheral surface 37 of the main shaft portion 38 of the piston rod 15 when inserted is indicated by a virtual line (two-dotted chain line).

The friction member 22C of the fourth embodiment includes the base portion 92 which is the same as the first embodiment and an elastic rubber portion 91C which is partially different from the elastic rubber portion 91 of the first embodiment. The elastic rubber portion 91C includes a main body portion 121C which is partially different from the main body portion 121 of the first embodiment and an inner covering portion 122 which is the same as the first embodiment.

Instead of the protrusion suppression structure portion 150 of the first embodiment, a protrusion suppression structure portion 150C is provided on the inner peripheral side between the minimum inner diameter portion 137 and the inner peripheral connection portion 130 in the axial direction of the main body portion 121C in order to suppress the protruding of the inner peripheral surface 140. The protrusion suppression structure portion 150C is a linear recess which is recessed outward in the radial direction from the middle position of the inner peripheral surface 140 in the axial direction, has a spiral shape, and is formed with a length of multiple turns, specifically, two turns. In the protrusion suppression structure portion 150C, a cross-section on a plane including the center axis of the friction member 22C is formed in a semi-circular shape. The protrusion suppression structure portion 150C is recessed from the inner peripheral surface 140 by a constant depth regardless of the circumferential position. The protrusion suppression structure portion 150C has a spiral shape of which the center axis is aligned with that of the base portion 92.

Since the protrusion suppression structure portion 150C is provided at the middle position in the axial direction, the inner peripheral surface 140 includes the partial surface portion 152 which is on the side of the minimum inner diameter portion 137 in relation to the protrusion suppression structure portion 150C, the partial surface portion 153 which is on the side of the inner peripheral connection portion 130, that is, the side opposite to the minimum inner diameter portion 137 in relation to the protrusion suppression structure portion 150C, and a partial surface portion 211 which is between the protrusion suppression structure portions 150C. The partial surface portion 211 is connected to the partial surface portion 152. The partial surface portion 153 is connected to the partial surface portion 211.

A part of the protrusion suppression structure portion 150C is formed in the range of the fixed portion 102 in the axial direction and the remaining part is formed in the range of the annular disk portion 101 in the axial direction.

The friction member 22C fitted to the piston rod 15 is provided at a position in which an end portion on the back side of a part of the protrusion suppression structure portion 150C is always separated from the piston rod 15. In other words, the friction member 22C is provided at a position in which the protrusion suppression structure portion 150C is partially separated from the piston rod 15 while being fitted to the piston rod 15.

The friction member 22C with the above-described structure is fitted to the medium diameter hole portion 56 of the rod guide 20 at the fixed portion 102 of the base portion 92 similarly to the first embodiment. The main shaft portion 38 of the piston rod 15 is inserted into the elastic rubber portion 91C of the friction member 22C with a predetermined tightening allowance similarly to the first embodiment.

The friction member 22C comes into close contact with the main shaft portion 38 of the piston rod 15 at least by the minimum inner diameter portion 137 of the elastic rubber portion 91C and the partial surface portion 152 on the side of the minimum inner diameter portion 137 in relation to the protrusion suppression structure portion 150C of the base end side tapered portion 141. Then, the axial rigidity of the elastic rubber portion 91C is decreased by the protrusion suppression structure portion 150C even when the piston rod 15 moves to any one of the contraction side and the extension side. As a result, preferable operating characteristics can be obtained similarly to the first embodiment.

Additionally, also in the fourth embodiment, a plurality of the protrusion suppression structure portions 150C which are recesses may be provided in the inner peripheral surface 140 to be arranged on the same spiral partially in the circumferential direction. That is, the protrusion suppression structure portion 150C may be also provided between the minimum inner diameter portion 137 and the inner peripheral connection portion 130 of the elastic rubber portion 91C at least partially in the circumferential direction and may be a recess which is provided in the inner peripheral surface 140 at least partially in the circumferential direction.

Further, the friction member 22C fitted to the piston rod 15 is provided at a position in which an end portion on the back side of the recess of a part of the protrusion suppression structure portion 150C is always separated from the piston rod 15, but may be provided at a position in which the entire protrusion suppression structure portion 150C is always separated from the piston rod 15. That is, the friction member 22C may be provided at a position in which the protrusion suppression structure portion 150C is at least partially separated from the piston rod 15 while being fitted to the piston rod 15.

Fifth Embodiment

Next, a fifth embodiment according to the present invention will be described mainly with reference to FIG. 11 by focusing on differences from the first embodiment. Additionally, the parts common to the first embodiment are indicated by the same name and the same reference numeral.

Figure 11:
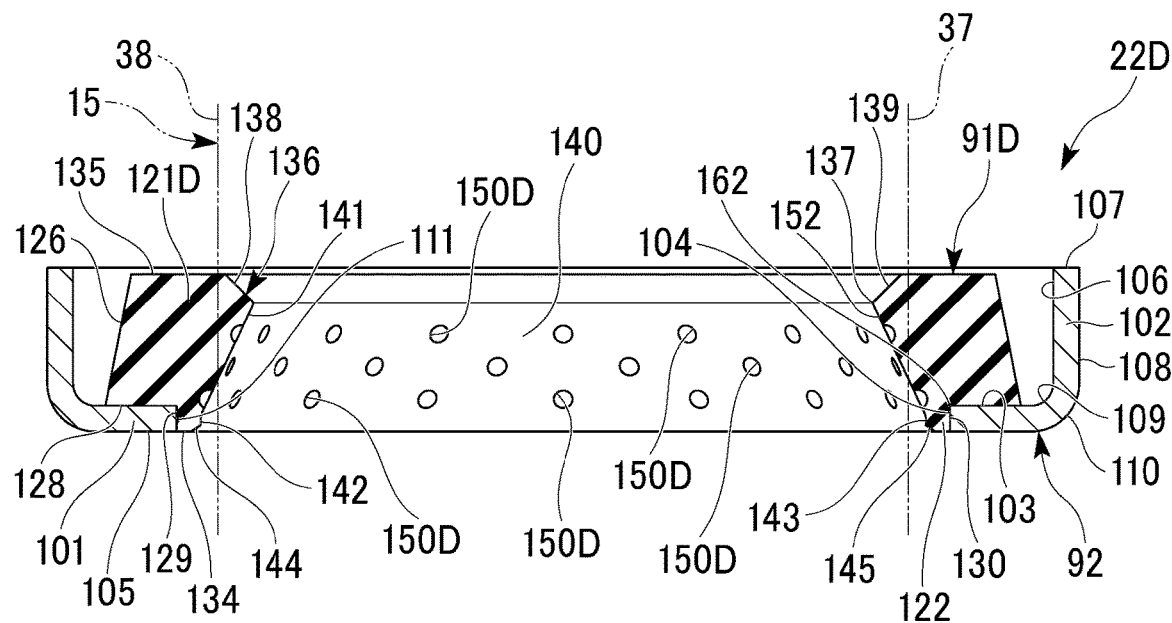
FIG. 11 is a cross-sectional view showing a friction member of a shock absorber according to a fifth embodiment of the present invention.

In the fifth embodiment, a friction member 22D of which a cross-section is shown in FIG. 11 is provided instead of the friction member 22 of the first embodiment. Additionally, also in FIG. 11, the friction member 22D in a natural state before the piston rod 15 is inserted is shown and the outer peripheral surface 37 of the main shaft portion 38 of the piston rod 15 when inserted is indicated by a virtual line (two-dotted chain line).

The friction member 22D of the fifth embodiment includes the base portion 92 which is the same as the first embodiment and an elastic rubber portion 91D which is partially different from the elastic rubber portion 91 of the first embodiment. The elastic rubber portion 91D includes a main body portion 121D which is partially different from the main body portion 121 of the first embodiment and the inner covering portion 122 which is the same as the first embodiment.

Instead of the protrusion suppression structure portion 150 of the first embodiment, a protrusion suppression structure portion 150D is provided on the inner peripheral side between the minimum inner diameter portion 137 and the inner peripheral connection portion 130 in the axial direction of the main body portion 121D in order to suppress the protruding of the inner peripheral surface 140. The protrusion suppression structure portion 150D is a large number of point-shaped recesses recessed outward in the radial direction from the middle position of the inner peripheral surface 140 in the axial direction and is disposed at the middle position of the inner peripheral surface 140 in the axial direction. The plurality of protrusion suppression structure portions 150D have the same shape and are recessed in a hemispherical shape by the same depth from the inner peripheral surface 140.

The protrusion suppression structure portions 150D are arranged in a row at equal intervals in the circumferential direction of the elastic rubber portion 91D at the intersection positions of the inner peripheral surface 140 and the plane orthogonal to the center axis of the elastic rubber portion 91D. A plurality of rows, specifically, three rows of the protrusion suppression structure portions 150D are provided at equal intervals in the axial direction of the elastic rubber portion 91D. In the row of the protrusion suppression structure portion 150D, adjacent rows are arranged so that the protrusion suppression structure portion 150D is shifted by half a pitch in the circumferential direction of the inner peripheral surface 140. Two rows of the protrusion suppression structure portions 150D on the side of the minimum inner diameter portion 137 are formed in the range of the fixed portion 102 in the axial direction. One row of the protrusion suppression structure portions 150D on the side opposite to the minimum inner diameter portion 137 are formed to overlap both the fixed portion 102 and the annular disk portion 101 in the axial direction.

The friction member 22D with the above-described structure is fitted to the medium diameter hole portion 56 of the rod guide 20 at the fixed portion 102 of the base portion 92 similarly to the first embodiment. The main shaft portion 38 of the piston rod 15 is inserted into the elastic rubber portion 91D of the friction member 22D with a predetermined tightening allowance similarly to the first embodiment.

The friction member 22D comes into close contact with the main shaft portion 38 of the piston rod 15 by the minimum inner diameter portion 137 of the elastic rubber portion 91D and the portion on the side of the minimum inner diameter portion 137 in the base end side tapered portion 141. Then, the axial rigidity of the elastic rubber portion 91D is decreased by the protrusion suppression structure portion 150D even when the piston rod 15 moves to any one of the contraction side and the extension side. As a result, preferable operating characteristics can be obtained similarly to the first embodiment.

Sixth Embodiment

Next, a sixth embodiment according to the present invention will be described mainly with reference to FIG. 12 by focusing on differences from the first embodiment. Additionally, the parts common to the first embodiment are indicated by the same name and the same reference numeral.

Figure 12:
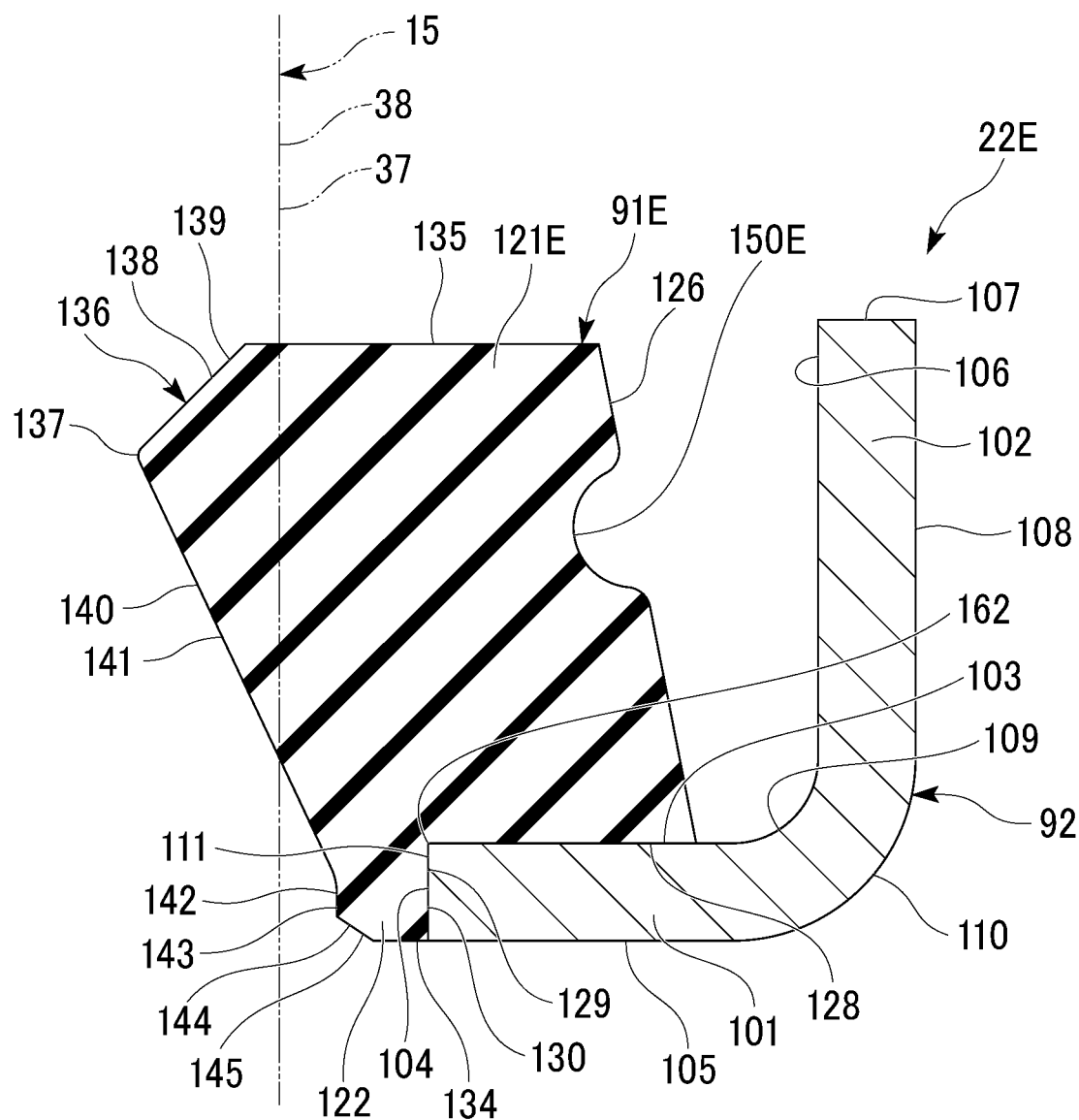
FIG. 12 is a one-sided cross-sectional view showing a friction member of a shock absorber according to a sixth embodiment of the present invention.

In the sixth embodiment, a friction member 22E of which a one-sided cross-section is shown in FIG. 12 is provided instead of the friction member 22 of the first embodiment. Additionally, also in FIG. 12, the friction member 22E in a natural state before the piston rod 15 is inserted is shown and the outer peripheral surface 37 of the main shaft portion 38 of the piston rod 15 when inserted is indicated by a virtual line (two-dotted chain line).

The friction member 22E of the sixth embodiment includes the base portion 92 which is the same as the first embodiment and an elastic rubber portion 91E which is partially different from the elastic rubber portion 91 of the first embodiment. The elastic rubber portion 91E includes a main body portion 121E which is partially different from the main body portion 121 of the first embodiment and the inner covering portion 122 which is the same as the first embodiment.

Instead of the protrusion suppression structure portion 150 of the first embodiment, a protrusion suppression structure portion 150E is provided on the outer peripheral side between the minimum inner diameter portion 137 and the inner peripheral connection portion 130 in the axial direction of the main body portion 121E in order to suppress the protruding of the inner peripheral surface 140. The protrusion suppression structure portion 150E is a recess which is recessed inward in the radial direction from the middle position of the outer peripheral surface 126 of the main body portion 121E in the axial direction.

The protrusion suppression structure portion 150E extends linearly and is formed on the outer peripheral surface 126 over the entire circumference thereof. The protrusion suppression structure portion 150E is formed in an endless annular shape of which the center axis is aligned with that of the outer peripheral surface 126. In other words, the protrusion suppression structure portion 150E is continuous in the circumferential direction of the elastic rubber portion 91E over the entire circumference. The protrusion suppression structure portion 150E has a semi-circular cross section having the same diameter on a plane including the center axis of the friction member 22E and is recessed from the outer peripheral surface 126 by a constant depth regardless of the circumferential position.

The entire protrusion suppression structure portion 150E is formed in the range of the fixed portion 102 in the axial direction. In other words, the entire protrusion suppression structure portion 150E is formed to be offset from the annular disk portion 101 in the axial direction. The entire protrusion suppression structure portion 150E is formed in the range of the annular disk portion 101 in the radial direction.

The friction member 22E with the above-described structure is fitted to the medium diameter hole portion 56 of the rod guide 20 at the fixed portion 102 of the base portion 92 similarly to the first embodiment. The main shaft portion 38 of the piston rod 15 is inserted into the elastic rubber portion 91E of the friction member 22E with a predetermined tightening allowance similarly to the first embodiment.

The friction member 22E comes into close contact with the main shaft portion 38 of the piston rod 15 by the minimum inner diameter portion 137 of the elastic rubber portion 91 and the portion on the side of the minimum inner diameter portion 137 in the inner peripheral surface 140 of the base end side tapered portion 141. Then, the axial rigidity of the elastic rubber portion 91E is decreased by the protrusion suppression structure portion 150E even when the piston rod 15 moves to any one of the contraction side and the extension side. As a result, preferable operating characteristics can be obtained similarly to the first embodiment.

Additionally, also in the sixth embodiment, the protrusion suppression structure portion 150E which is the recess may be provided in the outer peripheral surface 126 partially in the circumferential direction. That is, the protrusion suppression structure portion 150E may also be provided between the minimum inner diameter portion 137 and the inner peripheral connection portion 130 of the elastic rubber portion 91E at least partially in the circumferential direction and may be a recess which is provided in the outer peripheral surface 126 at least partially in the circumferential direction.

Further, a plurality of the protrusion suppression structure portions 150E which are the recesses of the sixth embodiment may be provided side by side in the axial direction of the friction member 22E as in the same manner with the protrusion suppression structure portions 150Ba and 150Bb of the third embodiment.

In the first to sixth embodiments, an example in which the base portion 92 includes the annular disk portion 101 and the cylindrical fixed portion 102 has been described, but the fixed portion 102 may not be provided. The base portion 92 may include only the annular disk portion 101.

Further, in the first to sixth embodiments, an example in which the friction members 22, 22A, 22B, 22C, 22D, and 22E are provided between the rod guide 20 and the seal member 21 and are fixed to the rod guide 20 has been described, but the friction members may be provided on the inner side of the cylinder 19 in relation to the seal member 21 in order to apply a frictional force while slidably contacting on the piston rod 15. For example, the friction members 22, 22A, 22B, 22C, 22D, and 22E may be directly fixed to the cylinder 19 instead of the rod guide 20.

Further, in the first to sixth embodiments, an example in which all of the elastic rubber portions 91, 91A, 91B, 91C, 91D, and 91E are separated from the inner peripheral surface 106 of the fixed portion 102 of the base portion 92 in the radial direction has been described, but a portion on the side of the annular disk portion 101 may be fixed to the inner peripheral surface 106 of the fixed portion 102 of the base portion 92. That is, each of the elastic rubber portions 91, 91A, 91B, 91C, 91D, and 91E may axially overlap the inner peripheral surface 106 of the fixed portion 102 at the front end side of the fixed portion 102 opposite to at least the annular disk portion 101 while being separated therefrom in the radial direction.

In the above-described embodiments, the double cylinder type hydraulic shock absorber has been described as the liquid pressure shock absorber, but the present invention can also be applied to liquid pressure shock absorbers such as a single cylinder type hydraulic shock absorber and a hydraulic active suspension.

According to a first aspect of the above-described embodiments, there is provided a shock absorber including: a cylinder in which a working liquid is enclosed; a piston which is slidably fitted into the cylinder and divides the inside of the cylinder into two chambers; a piston rod which is connected to the piston and extends to the outside of the cylinder; a seal member that slidably contacts to the piston rod and prevents the working liquid from leaking to the outside of the cylinder; a friction member that is provided on the inner side of the cylinder in relation to the seal member and includes an annular elastic rubber portion which slidably contacts to the piston rod and an annular base portion to which the elastic rubber portion is fixed; and a communication path which decreases a pressure difference between both sides of the friction member in an axial direction. The base portion includes an annular disk portion. The elastic rubber portion includes a minimum inner diameter portion on an inner peripheral side and includes an inner peripheral connection portion connected to an inner peripheral portion of the annular disk portion. A protrusion suppression structure portion that suppresses protruding of an inner peripheral surface formed from the minimum inner diameter portion toward the inner peripheral connection portion is provided at least partially in a circumferential direction between the inner peripheral connection portion and the minimum inner diameter portion of the elastic rubber portion. Accordingly, preferable operating characteristics can be obtained.

According to a second aspect, in the first aspect, the protrusion suppression structure portion is a notch which is provided in the inner peripheral surface at least partially in the circumferential direction. Accordingly, preferable operating characteristics can be easily obtained.

According to a third aspect, in the first aspect, the protrusion suppression structure portion is a recess which is provided in the inner peripheral surface at least partially in the circumferential direction. Accordingly, even better operating characteristics can be obtained.

According to a fourth aspect, in any one of the first to third aspects, the protrusion suppression structure portion is provided in the inner peripheral surface over an entire circumference. Accordingly, even better operating characteristics can be obtained.

According to a fifth aspect, in any one of the first to fourth aspects, the friction member is provided at a position in which the protrusion suppression structure portion is at least partially separated from the piston rod while being fitted to the piston rod. Accordingly, even better operating characteristics can be obtained.

According to a sixth aspect, in any one of the first to fifth aspects, in a natural state of the friction member, the protrusion suppression structure portion extends to a line segment connecting the inner peripheral connection portion and an end portion on the side of the inner peripheral connection portion in a portion on the side opposite to the inner peripheral connection portion in relation to the protrusion suppression structure portion of the inner peripheral surface. Accordingly, even better operating characteristics can be obtained.

According to a seventh aspect, in any one of the first to sixth aspects, the base portion includes a cylindrical fixed portion for fixing the friction member to a target portion. Accordingly, the friction member can be satisfactorily fixed to the target portion.

According to an eighth aspect, in the seventh aspect, the fixed portion extends in the axial direction with the annular disk portion side as a base end and the elastic rubber portion is radially separated from an inner peripheral side of the fixed portion on at least a front end side of the fixed portion. Accordingly, even better operating characteristics can be obtained.

INDUSTRIAL APPLICABILITY

According to the shock absorber, preferable operating characteristics can be obtained.

REFERENCE SIGNS LIST

11 Shock absorber
15 Piston rod
16, 17 Chamber
18 Piston
19 Cylinder
21 Seal member
22, 22A, 22B, 22C, 22D, 22E Friction member
91, 91A, 91B, 91C, 91D, 91E Elastic rubber portion
92 Base portion
95 Communication path
101 Annular disk portion
102 Fixed portion
130 Inner peripheral connection portion
137 Minimum inner diameter portion
140 Inner peripheral surface
150, 150A, 150Ba, 150Bb, 150C, 150D, 150E Protrusion suppression structure portion
161, 162 End portion
X Line segment

The invention claimed is:

1. A shock absorber comprising:
a cylinder in which a working liquid is enclosed;
a piston which is slidably fitted into the cylinder and divides the inside of the cylinder into two chambers;
a piston rod which is connected to the piston and extends to the outside of the cylinder;
a seal member that slidably contacts to the piston rod and prevents the working liquid from leaking to the outside of the cylinder;
a friction member that is provided on the inner side of the cylinder in relation to the seal member, the friction member including an annular elastic rubber portion which slidably contacts to the piston rod and an annular base portion to which the elastic rubber portion is fixed; and
a communication path which decreases a pressure difference between both sides of the friction member in an axial direction,
wherein the base portion includes an annular disk portion, and
wherein the elastic rubber portion includes:
an inner peripheral connection portion connected to an inner peripheral portion of the annular disc portion;
a minimum inner diameter portion that is disposed on a position apart from an end portion in a thickness direction of the annular disk portion, the minimum inner diameter portion provided on an inner circumferential side of the annular disc portion;
an inner peripheral surface having an inner diameter increasing from the minimum inner diameter portion to a direction toward the annular disk portion; and
a protrusion suppression structure portion provided at least partially in a circumferential direction of the inner peripheral surface, the protrusion suppression structure portion configured to suppresses protruding of the inner peripheral surface in a radial direction.

2. The shock absorber according to claim 1,
wherein the protrusion suppression structure portion is a notch which is provided in the inner peripheral surface at least partially in the circumferential direction.

3. The shock absorber according to claim 1,
wherein the protrusion suppression structure portion is a recess which is provided in the inner peripheral surface at least partially in the circumferential direction.

4. The shock absorber according to claim 1,
wherein the protrusion suppression structure portion is provided in the inner peripheral surface over an entire circumference.

5. The shock absorber according to claim 1,
wherein the friction member is provided at a position in which the protrusion suppression structure portion is at least partially separated from the piston rod while being fitted to the piston rod.

6. The shock absorber according to claim 1,
wherein in a natural state of the friction member, the protrusion suppression structure portion extends to a line segment connecting the inner peripheral connection portion and an end portion on the side of the inner peripheral connection portion in a portion on the side opposite to the inner peripheral connection portion in relation to the protrusion suppression structure portion of the inner peripheral surface, the natural state being a state of the friction member before being inserted with the piston rod.

7. The shock absorber according to claim 1,
wherein the base portion includes a cylindrical fixed portion for fixing the friction member to a target portion.

8. The shock absorber according to claim 7,
wherein the fixed portion extends in the axial direction with the annular disk portion side as a base end and the elastic rubber portion is radially separated from an inner peripheral side of the fixed portion on at least a front end side of the fixed portion.

* * * * *